(12) United States Patent
Kim et al.

(10) Patent No.: US 12,218,768 B2
(45) Date of Patent: *Feb. 4, 2025

(54) METHOD AND APPARATUS FOR TRANSMITTING AND RECEIVING CONTROL INFORMATION IN WIRELESS COMMUNICATION SYSTEM

(71) Applicant: LG Electronics Inc., Seoul (KR)

(72) Inventors: Seonwook Kim, Seoul (KR); Suckchel Yang, Seoul (KR); Seunghwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 17/711,527

(22) Filed: Apr. 1, 2022

(65) Prior Publication Data

US 2022/0329366 A1 Oct. 13, 2022

Related U.S. Application Data

(60) Provisional application No. 63/280,098, filed on Nov. 16, 2021, provisional application No. 63/190,233, filed on May 18, 2021.

(30) Foreign Application Priority Data

Apr. 2, 2021 (KR) .................. 10-2021-0043588
Apr. 12, 2021 (KR) .................. 10-2021-0047292
(Continued)

(51) Int. Cl.
*H04W 72/23* (2023.01)
*H04L 1/1867* (2023.01)

(52) U.S. Cl.
CPC .......... *H04L 1/1887* (2013.01); *H04L 1/1893* (2013.01); *H04W 72/23* (2023.01)

(58) Field of Classification Search
None
See application file for complete search history.

(56) References Cited

U.S. PATENT DOCUMENTS

2013/0242816 A1* 9/2013 He .................. H04L 1/08
370/280
2020/0328849 A1* 10/2020 Noh .................. H04L 1/1812
(Continued)

FOREIGN PATENT DOCUMENTS

KR 20150037762 4/2015
WO WO 2019/139908 7/2019
(Continued)

OTHER PUBLICATIONS

Office Action in Korean Appln. No. 10-2023-7008004, mailed on May 15, 2023, 12 pages (with English translation).
(Continued)

*Primary Examiner* — Ajit Patel
(74) *Attorney, Agent, or Firm* — Fish & Richardson P.C.

(57) ABSTRACT

A method and an apparatus of transmitting and receiving control information in a wireless communication system is disclosed. A method of transmitting control information in a wireless communication system according to an embodiment of the present disclosure may include receiving, from a base station, first configuration information for configuring HARQ (Hybrid Automatic Repeat and request)-ACK (acknowledgement) bundling for one or more serving cells among a plurality of serving cells configured for the terminal; receiving, from the base station, downlink control information (DCI) for scheduling one or more physical downlink shared channels (PDSCH) on each of the plurality of serving cells; receiving, from the base station, a plurality of PDSCHs on the plurality of serving cells; and transmitting, to the base station, control information including a
(Continued)

HARQ-ACK codebook generated based on HARQ-ACK information for the plurality of PDSCHs.

13 Claims, 15 Drawing Sheets

(30) Foreign Application Priority Data

| May 7, 2021 | (KR) | 10-2021-0059414 |
|---|---|---|
| Sep. 29, 2021 | (KR) | 10-2021-0129077 |
| Feb. 11, 2022 | (KR) | 10-2022-0017952 |

(56) References Cited

U.S. PATENT DOCUMENTS

| 2021/0227570 A1 | 7/2021 | Park et al. |
| 2021/0288757 A1 | 9/2021 | Jacobsen et al. |
| 2021/0314033 A1 | 10/2021 | Fakoorian et al. |
| 2022/0045801 A1 | 2/2022 | Wang |
| 2022/0078827 A1 | 3/2022 | Zhang et al. |
| 2022/0149996 A1 | 5/2022 | Moon et al. |
| 2022/0248436 A1 | 8/2022 | Zhang et al. |
| 2022/0322313 A1 | 10/2022 | Zhang et al. |
| 2022/0376835 A1 | 11/2022 | Mu |
| 2022/0408486 A1 | 12/2022 | Liang et al. |
| 2023/0179339 A1* | 6/2023 | Jacobsen ........... H04W 72/0446 370/329 |

FOREIGN PATENT DOCUMENTS

| WO | WO 2020/060372 | 3/2020 |
| WO | WO 2020/111686 | 6/2020 |

OTHER PUBLICATIONS

Office Action in U.S. Appl. No. 18/153,714, mailed on May 5, 2023, 7 pages.

Wilus Inc., "Discussion on HARQ-ACK multiplexing and bundling for NR," 3GPP TSG RAN WG1 Meeting 91, R1-1720876, Reno, USA, Nov. 27-Dec. 1, 2017, 6 pages.

ZTE, "Support of HARQ-ACK bundling for MTC," 3GPP TSG RAN WG1 Meeting #86bis, R1-1609830, Lisbon, Portugal, Oct. 10-14, 2016, 5 pages.

International Search Report in International Appln. No. PCT/KR2022/004626, dated Jul. 6, 2022, 11 pages (with English translation).

ZTE, "Text proposals on type-3 HARQ-ACK codebook and multi-PUSCH scheduling," R1-2007961, Presented at 3GPP TSG RAN WG1 Meeting #103e, e-Meeting, Oct. 26-Nov. 13, 2020, 6 pages.

Ericsson, "PDSCH/PUSCH enhancements," R1-2101310, 3GPP TSG-RAN WG1, Meeting #104-e, Online, Jan. 25-Feb. 5, 2021, 28 pages.

Nokia, Nokia Shanghai Bell, "PDSCH/PUSCH enhancements," R1-2200187, 3GPP TSG RAN WG1, #107bis-e, e-Meeting, Jan. 17-25, 2022, 4 pages.

Office Action in Japanese Appln. No. 2023-560659, mailed on Oct. 1, 2024, 2 pages.

* cited by examiner

METHOD AND APPARATUS FOR TRANSMITTING AND RECEIVING CONTROL INFORMATION IN WIRELESS COMMUNICATION SYSTEM

CROSS-REFERENCE TO RELATED APPLICATIONS

This application claims the benefit of earlier filing date and right of priority to Korean Application No. 10-2021-0043588, filed on Apr. 2, 2021, Korean Application No. 10-2021-0047292, filed on Apr. 12, 2021, Korean Application No. 10-2021-0059414, filed on May 7, 2021, U.S. Provisional Application No. 63/190,233, filed on May 18, 2021, Korean Application No. 10-2021-0129077, filed on Sep. 29, 2021, U.S. Provisional Application No. 63/280,098, filed on Nov. 16, 2021, and Korean Application No. 10-2022-0017952, filed on Feb. 11, 2022, the contents of which are all hereby incorporated by reference herein in their entirety.

TECHNICAL FIELD

The present disclosure relates to a wireless communication system, and in more detail, relates to a method and an apparatus of transmitting and receiving uplink control information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of scheduling one or more downlink transmissions and/or one or more uplink transmissions through single downlink control information.

An additional technical object of the present disclosure is to provide a method and an apparatus of transmitting and receiving Hybrid Automatic Repeat and request (HARQ)-acknowledgement (ACK) information for one or more downlink transmissions scheduled through single downlink control information.

In addition, an additional technical object of the present disclosure is to provide a method and an apparatus of transmitting and receiving a HARQ-ACK codebook when HARQ-ACK information is generated for a plurality of PDSCHs for each predetermined group.

The technical objects to be achieved by the present disclosure are not limited to the above-described technical objects, and other technical objects which are not described herein will be clearly understood by those skilled in the pertinent art from the following description.

A method of transmitting control information in a wireless communication system according to an aspect of the present disclosure may include receiving, from a base station, first configuration information for configuring HARQ (Hybrid Automatic Repeat and request)-ACK (acknowledgement) bundling for one or more serving cells among a plurality of serving cells configured for the terminal; receiving, from the base station, downlink control information (DCI) for scheduling one or more physical downlink shared channels (PDSCH) on each of the plurality of serving cells; receiving, from the base station, a plurality of PDSCHs on the plurality of serving cells; and transmitting, to the base station, control information including a HARQ-ACK codebook generated based on HARQ-ACK information for the plurality of PDSCHs. The HARQ-ACK codebook may include a first HARQ-ACK sub-codebook and the second HARQ-ACK sub-codebook, the first HARQ-ACK sub-codebook may be generated for PDSCHs on one or more first serving cells for which the number of groups of the HARQ bundling is set to 1, the second HARQ-ACK sub-codebook may be generated for PDSCHs on one or more second serving cells for which the number of HARQ bundling groups is set greater than 1.

A method of receiving control information in a wireless communication system according to an additional aspect of the present disclosure may include transmitting, to a terminal, first configuration information for configuring HARQ (Hybrid Automatic Repeat and request)-ACK (acknowledgement) bundling for one or more serving cells among a plurality of serving cells configured for the terminal; transmitting, to the terminal, downlink control information (DCI) for scheduling one or more physical downlink shared channels (PDSCH) on each of the plurality of serving cells; transmitting, to the terminal, a plurality of PDSCHs on the plurality of serving cells; and receiving, from the terminal, control information including a HARQ-ACK codebook generated based on HARQ-ACK information for the plurality of PDSCHs. The HARQ-ACK codebook may include a first HARQ-ACK sub-codebook and the second HARQ-ACK sub-codebook, the first HARQ-ACK sub-codebook may be generated for PDSCHs on one or more first serving cells for which the number of groups of the HARQ bundling is set to 1, the second HARQ-ACK sub-codebook may be generated for PDSCHs on one or more second serving cells for which the number of HARQ bundling groups is set greater than 1.

According to an embodiment of the present disclosure, by supporting scheduling for one or more downlink transmissions and/or one or more uplink transmissions through one downlink control information, transmission efficiency of scheduling downlink control information for downlink transmission and/or uplink transmission can be increased.

In addition, according to an embodiment of the present disclosure, by generating HARQ-ACK information for a plurality of PDSCHs for each predetermined group, overhead in HARQ-ACK information bits can be reduced.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
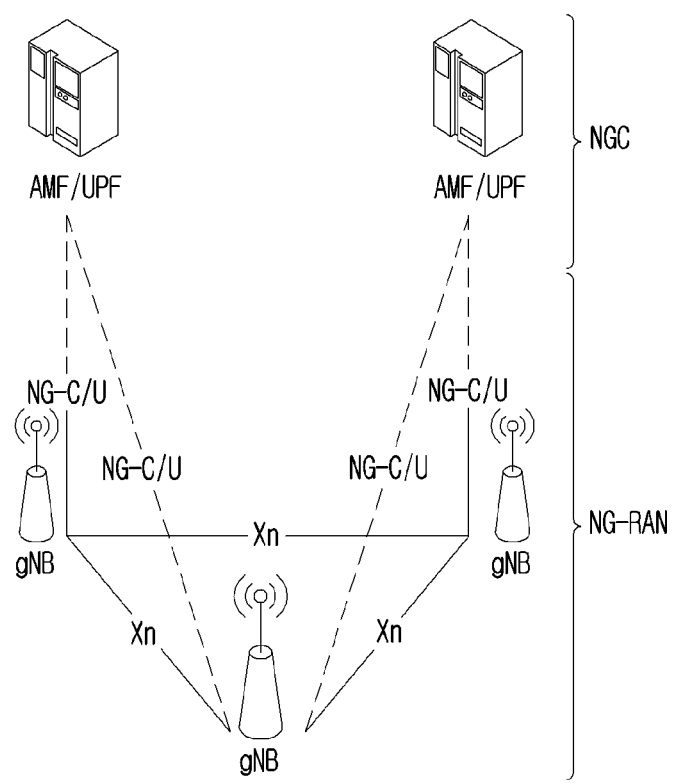
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/ LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information-reference signal resource indicator
- CSI: channel state information
- CSI-IM: channel state information-interference measurement
- CSI-RS: channel state information-reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
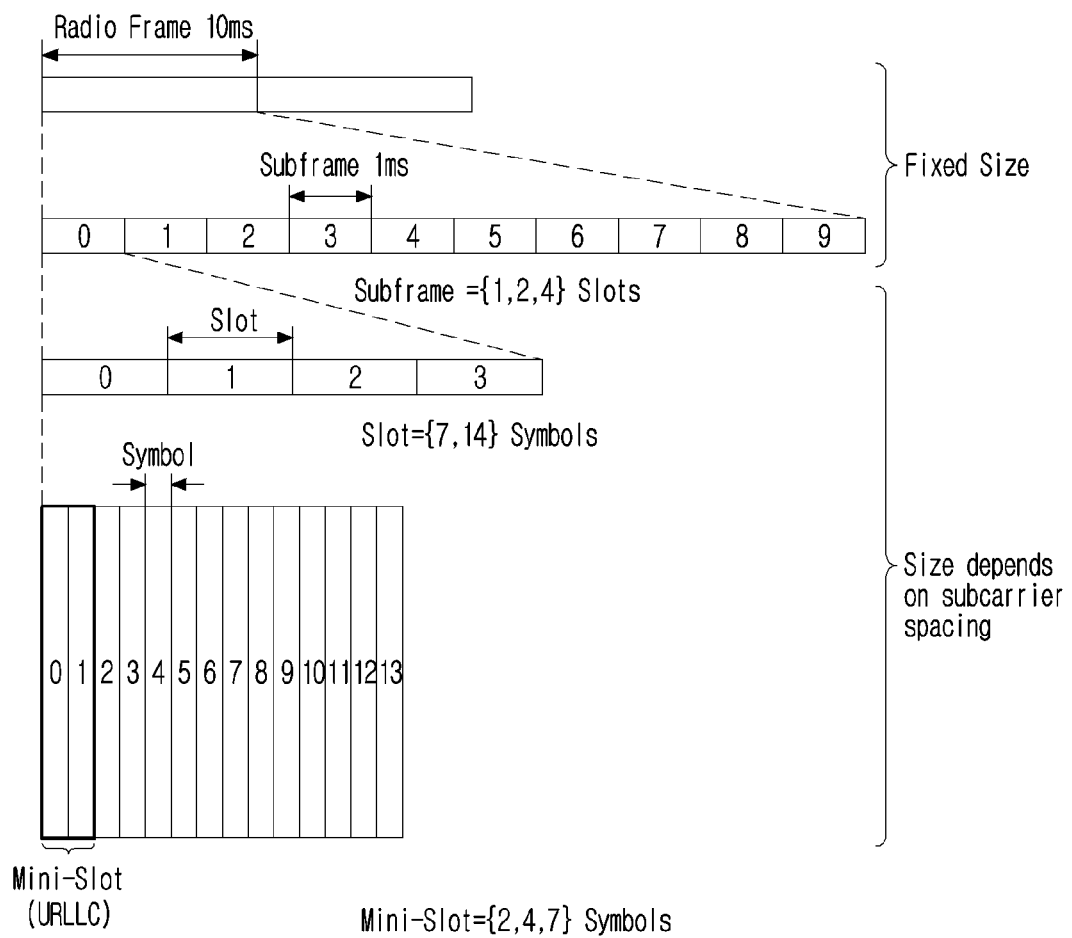
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}$slot | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
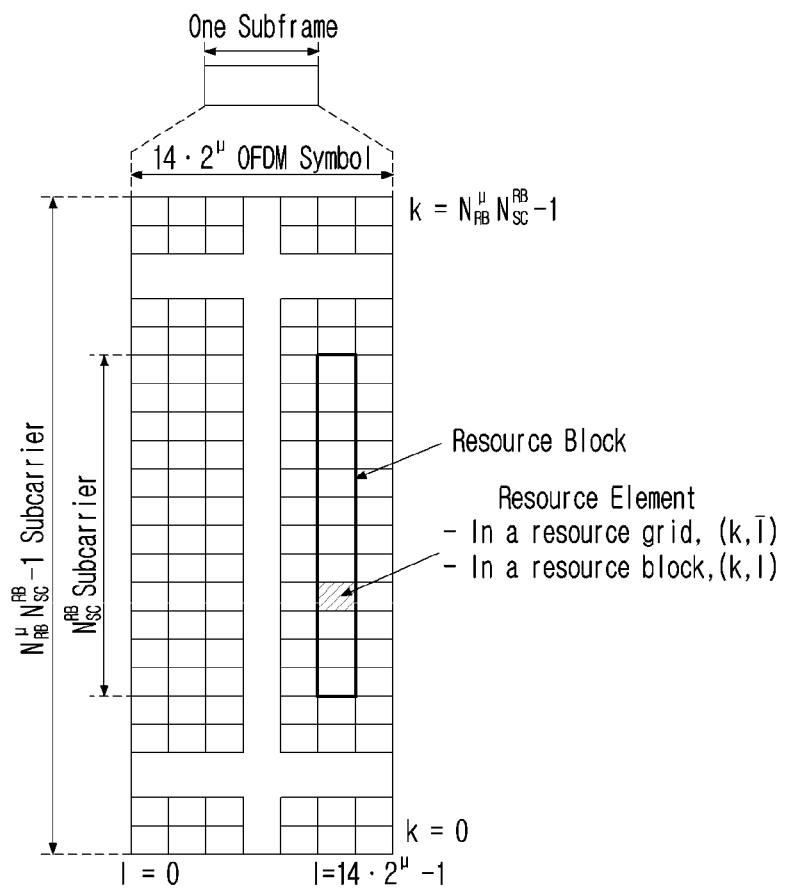
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

[Equation 1]

$$n_{CRB}^{\mu} = \left\lfloor \frac{k}{N_{SC}^{RB}} \right\rfloor$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

[Equation 2]

$$n_{CRB}^{\mu} = n_{PRB}^{\mu} + N_{BWP,i}^{start,\mu}$$

$N_{BWP,i}^{start,\mu}$ is a common resource block that a BWP starts relatively to common resource block 0.

Figure 4:
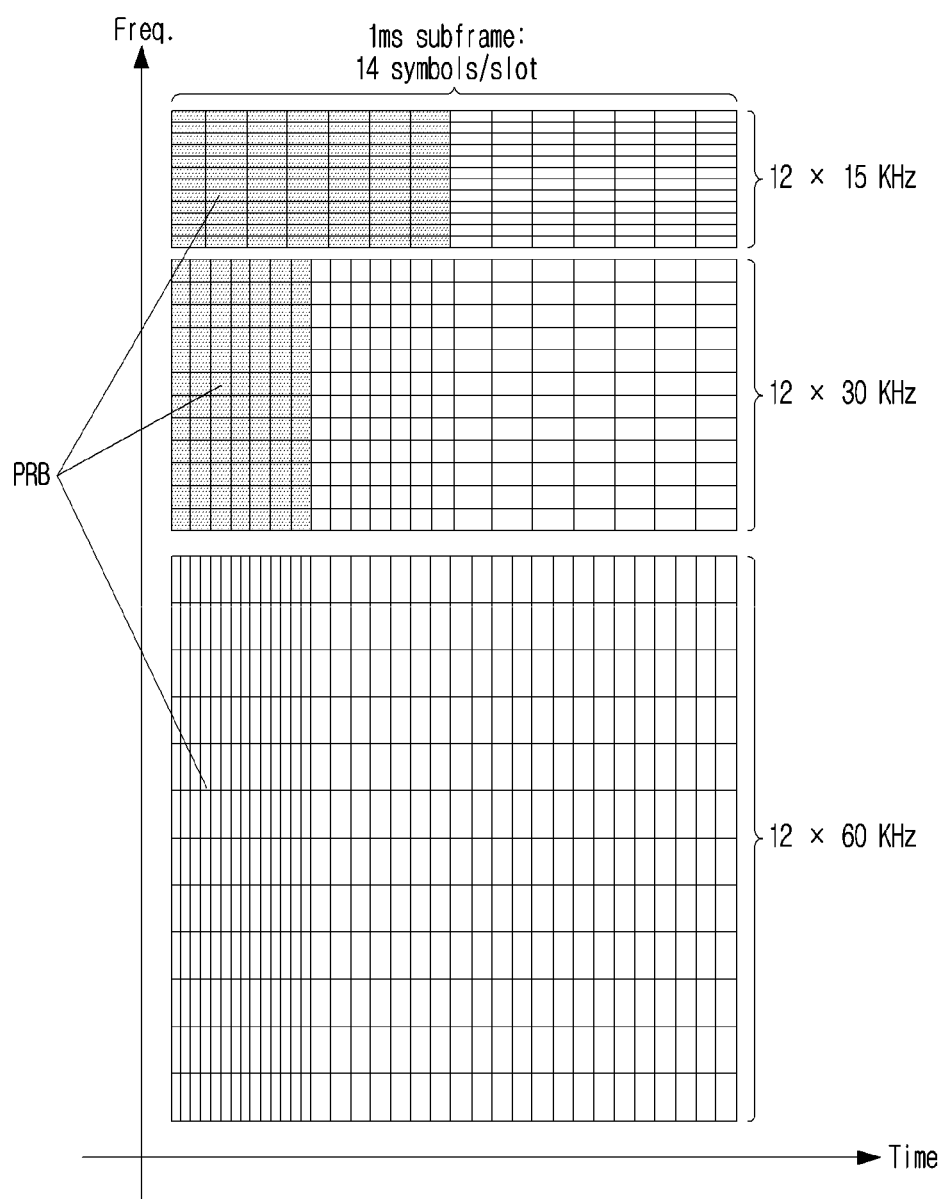
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
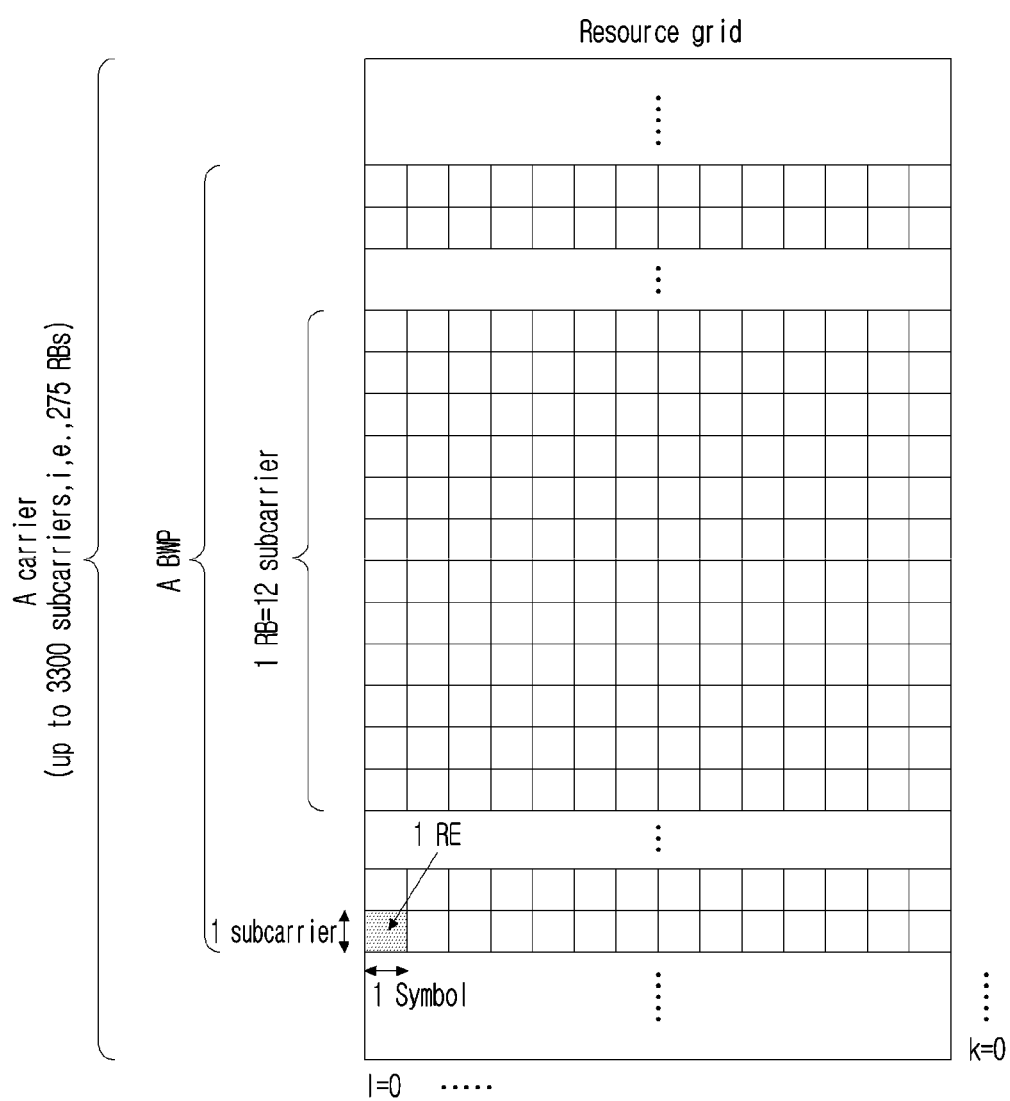
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
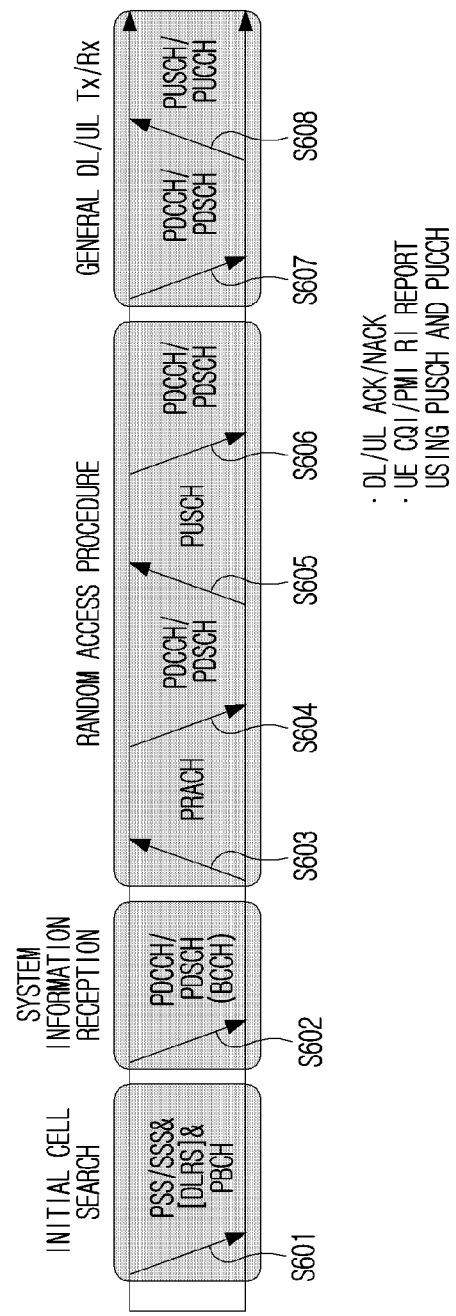
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
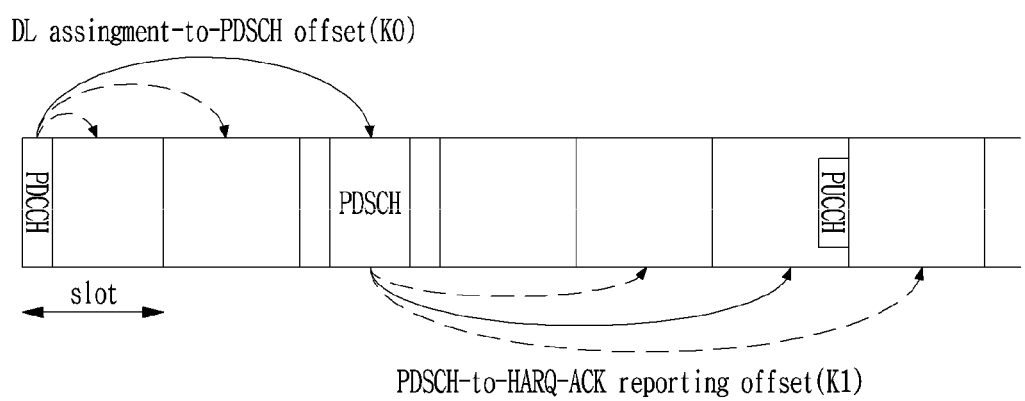
FIG. 7 illustrates a HARQ-ACK process for downlink data in a wireless communication system to which the present disclosure may be applied.

Data Transmission and HARQ (Hybrid Automatic Repeat and reQuest)-ACK (Acknowledgment) Process FIG. 7 illustrates a HARQ-ACK process for downlink data in a wireless communication system to which the present disclosure may be applied.

Referring to FIG. 7, a UE may detect a PDCCH in slot #n. Here, a PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: indicates a RB resource (e.g., one or more (dis-) continuous RBs) allocated to a PDSCH.

Time domain resource assignment: K0, indicates a starting position (e.g., OFDM symbol index) and a length (e.g., number of OFDM symbols) of a PDSCH in a slot
PDSCH-to-HARQ_feedback timing indicator: indicates K1.
HARQ process number (4 bits): indicates a HARQ process ID (Identity) for data (e.g., PDSCH, TB).
PUCCH resource indicator (PRI: PUCCH resource indicator): indicates a PUCCH resource to be used for UCI transmission among a plurality of PUCCH resources in a PUCCH resource set.

Thereafter, a UE may receive a PDSCH in a slot #(n+K0) according to scheduling information of slot #n, and then transmit UCI through PUCCH in a slot #(n+K1). Here, UCI includes a HARQ-ACK response for a PDSCH. If a PDSCH is configured to transmit up to 1 TB, a HARQ-ACK response may be configured with 1-bit. When a PDSCH is configured to transmit up to 2 TBs, a HARQ-ACK response may be configured with 2-bits when spatial bundling is not configured, and may be configured with 1-bits when spatial bundling is configured. When the HARQ-ACK transmission time for a plurality of PDSCHs is designated as a slot #(n+K1), UCI transmitted in a slot #(n+K1) includes HARQ-ACK responses for the plurality of PDSCHs.

CBG (Code Block Group)-Based HARQ Process

In LTE, a Transport Block (TB)-based HARQ process is supported. In NR, a CBG-based HARQ process is supported along with the TB-based HARQ process.

Figure 8:
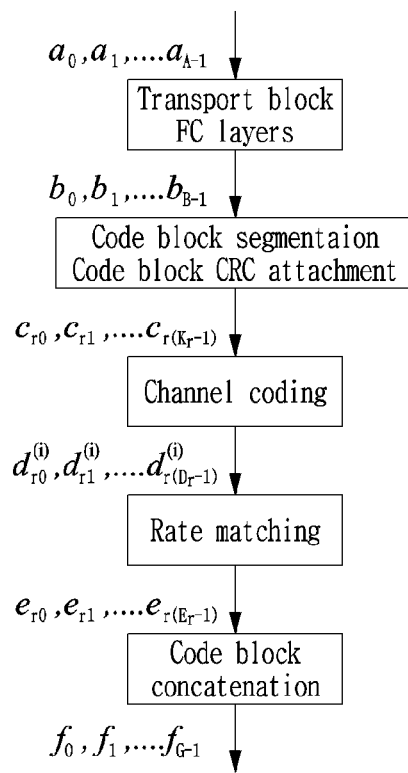
FIG. 8 illustrates a processing process and structure of a TB in a wireless communication system to which the present disclosure may be applied.
Figure 8:
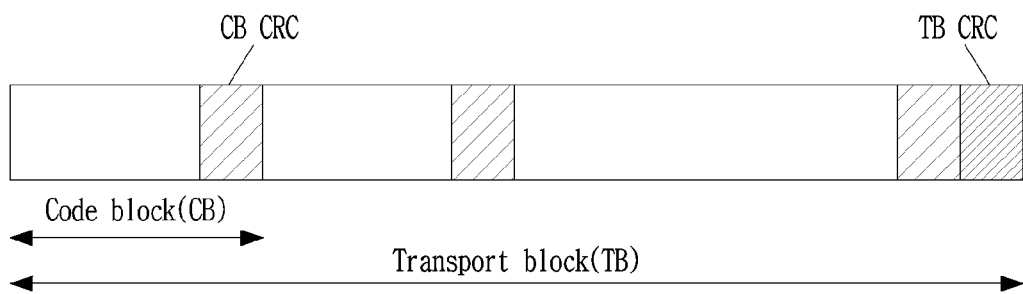

FIG. 8 illustrates a processing process and structure of a TB in a wireless communication system to which the present disclosure may be applied.

The procedure of FIG. 8 may be applied to data of a DL-Shared Channel (DL-SCH), a Paging Channel (PCH) and a Multicast Channel (MCH) transport channel. UL TB (or data of UL transport channel) may be similarly processed.

Referring to FIG. 8, a transmitter attaches a CRC (e.g., 24-bits) (TB CRC) to a TB for error checking. Thereafter, a transmitter may divide TB+CRC into a plurality of code blocks in consideration of a size of a channel encoder. As an example, the maximum size of a codeblock (CB) in LTE is 6144-bit. Accordingly, if a TB size is smaller than 6144-bit, a CB is not configured, and if a TB size is larger than 6144-bit, a TB is divided into 6144-bit size units to generate a plurality of CBs. A CRC (e.g., 24-bits) (CB CRC) is individually attached to each CB for error checking. After each CB is channel-coded and rate-matched, a codeword (CW) is generated by combining them into one. Data scheduling and a HARQ process according thereto are performed in units of TB, and CB CRC is used to determine early termination of TB decoding.

Figure 9:
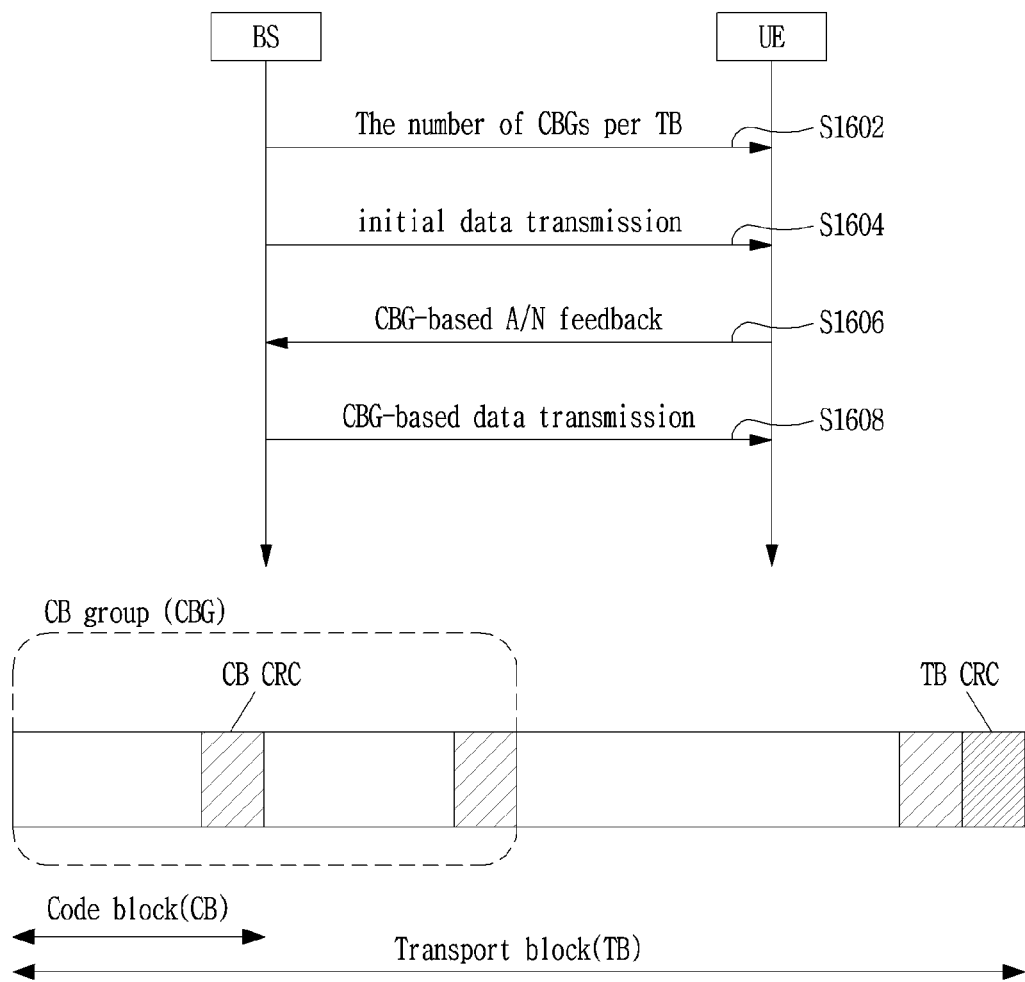
FIG. 9 illustrates a CBG-based HARQ process in a wireless communication system to which the present disclosure may be applied.

FIG. 9 illustrates a CBG-based HARQ process in a wireless communication system to which the present disclosure may be applied.

In a CBG-based HARQ process, data scheduling and a corresponding HARQ process may be performed in units of CBG.

Referring to FIG. 9, a UE may receive information on the maximum number M of codeblock groups (CBG) per transport block from a base station through a higher layer signal (e.g., RRC signal) (S1602). Thereafter, a UE may receive an initial data transmission (through PDSCH) from a base station (S1604). Here, data includes a TB, a transport block includes a plurality of CBs, and a plurality of CBs may be classified into one or more CBGs. Here, some of CBGs may include ceiling (K/M) number of CBs, and the remaining CBGs may include flooring (K/M) number of CBs. K represents the number of CBs in data. Thereafter, a UE may feed back CBG-based A/N information for data to a base station (S1606), and a base station may perform data retransmission based on a CBG (S1608). A/N information may be transmitted through PUCCH or PUSCH. Here, A/N information may include a plurality of A/N bits for data, and each A/N bit may indicate each A/N response generated in units of CBG for data. A payload size of A/N information may be maintained the same based on M regardless of CBG included in data.

Dynamic/Semi-Static HARQ-ACK Codebook Scheme

NR supports a dynamic HARQ-ACK codebook scheme and a semi-static HARQ-ACK codebook scheme. A HARQ-ACK (or A/N) codebook may be substituted with a HARQ-ACK payload.

When a dynamic HARQ-ACK codebook scheme is configured, a size of an A/N payload varies according to the actual number of scheduled DL data. To this end, a PDCCH related to DL scheduling includes a counter-downlink assignment index (counter-DAI) and a total-DAI. A counter-DAI indicates a {CC, slot} scheduling order value calculated in a CC (Component Carrier) (or cell)-first method, and is used to designate a position of an A/N bit in an A/N codebook. A total-DAI indicates a slot-unit scheduling accumulative value up to a current slot, and is used to determine a size of an A/N codebook.

When a semi-static A/N codebook scheme is configured, a size of an A/N codebook is fixed (to a maximum value) regardless of the actual number of scheduled DL data. Specifically, an (maximum) A/N payload (size) transmitted through one PUCCH in one slot may be determined by the number of corresponding A/N bits corresponding to a combination of all CCs configured for a UE and all DL scheduling slots (or PDSCH transmission slots or PDCCH monitoring slots) to which the A/N transmission timing can be indicated (hereinafter, bundling window). For example, DL grant DCI (PDCCH) includes PDSCH-to-A/N timing information, and the PDSCH-to-A/N timing information may have one (e.g., k) of a plurality of values. For example, when a PDSCH is received in slot #m, and PDSCH-to-A/N timing information in the DL grant DCI (PDCCH) scheduling the PDSCH indicates k, the A/N information for the PDSCH may be transmitted in slot #(m+k). As an example, k∈{1, 2, 3, 4, 5, 6, 7, 8} may be given. Meanwhile, when A/N information is transmitted in slot #n, the A/N information may include a maximum possible A/N based on a bundling window. That is, A/N information of slot #n may include an A/N corresponding to slot #(n−k). For example, if k∈{1, 2, 3, 4, 5, 6, 7, 8}, A/N information of slot #n includes A/Ns (i.e., the maximum number of A/Ns) corresponding to from slot #(n−8) to slot #(n−1) regardless of actual DL data reception. Here, A/N information may be substituted with an A/N codebook and an A/N payload. In addition, a slot may be understood as/substituted with a candidate occasion for DL data reception. As an example, a bundling window may be determined based on PDSCH-to-A/N timing based on an A/N slot, and a PDSCH-to-A/N timing set may has a pre-defined value (e.g., {1, 2, 3, 4, 5, 6, 7, 8}) or may be configured by higher layer (RRC) signaling.

A dynamic/semi-static HARQ-ACK codebook configuration defined in the NR standard is as follows. When a UE is configured with a PDSCH HARQ-ACK codebook (pdsch-HARQ-ACK-Codebook) parameter set to semi-static, the UE determines a Type-1 HARQ-ACK codebook report (i.e., a semi-static HARQ-ACK codebook). On the other hand, when a UE is configured with a PDSCH HARQ-ACK codebook (pdsch-HARQ-ACK-Codebook) (or pdsch- HARQ-ACK-Codebook-r16) parameter set to dynamic, the UE determines a Type-2 HARQ-ACK codebook report (i.e., a dynamic HARQ-ACK codebook).

HARQ-ACK Codebook Configuration Method for Multiple PDSCH Scheduling

PUSCH: Physical Uplink Shared Channel
RRM: Radio resource management
SCS: Sub-carrier spacing
RLM: Radio link monitoring
DCI: Downlink Control Information
CAP: Channel Access Procedure
Ucell: Unlicensed cell
TBS: Transport Block Size
TDRA: Time Domain Resource Allocation
SLIV: Start and Length Indicator Value. (It is an indication value for a start symbol index and the number of symbols in a slot of a PDSCH and/or PUSCH. It may be configured as a component of an entry in a TDRA field in a PDCCH for scheduling a corresponding PDSCH and/or PUSCH.)
BWP: Bandwidth Part (BandWidth Part) (It may be configured with continuous resource blocks (RB) on a frequency axis. One numerology (e.g., SCS, CP length, slot/mini-slot duration, etc.). In addition, a plurality of BWPs may be configured in one carrier (the number of BWPs per carrier may also be limited), however the number of activated BWPs may be limited to a part (e.g., one) per carrier.)
CORESET: Control resource set (It means a time frequency resource region in which a PDCCH can be transmitted, the number of CORESETs per BWP may be limited.)
REG: Resource element group
SFI: Slot Format Indicator (It is an indicator indicating a symbol level DL/UL direction in a specific slot(s), it is transmitted through a group common PDCCH.)
COT: Channel occupancy time
SPS: Semi-persistent scheduling
QCL: Quasi-Co-Location (A QCL relationship between two reference signals (RS) may mean that QCL parameters such as Doppler shift, Doppler spread, average delay, average spread, and spatial reception parameter, etc. obtained from one RS can be applied to other RSs (or antenna port(s) of a corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For a certain DL RS antenna port(s), a first DL RS is configured as a reference for QCL type X (X=A, B, C, or D), and in addition, a second DL RS may be configured as a reference for QCL type Y (Y=A, B, C, or D, but X≠Y).)
TCI: Transmission Configuration Indication (One TCI state includes a QCL relationship between one or a plurality of DL RSs and DM-RS ports of a PDSCH, DM-RS ports of a PDCCH, or CSI-RS port(s) of a CSI-RS resource. For 'Transmission Configuration Indication' among fields in DCI for scheduling a PDSCH, a TCI state index corresponding to each code point in the field is activated by a MAC control element (CE), and a TCI state configuration for each TCI state index is configured through RRC signaling. In the Rel-16 NR system, a corresponding TCI state is configured between DL RSs, but configuration between DL RS and UL RS or between UL RS and UL RS may be allowed in a future release. As an example of a UL RS, there are an SRS, a PUSCH DM-RS, and a PUCCH DM-RS, etc.)
SRI: SRS resource indicator (It indicates one of SRS resource index values configured in 'SRS resource indicator' among fields in DCI for scheduling a PUSCH. When a UE transmits a PUSCH, the UE may transmit the PUSCH by using the same spatial domain transmission filter used for transmitting and receiving a reference signal associated with a corresponding SRS resource. Here, a reference RS is configured by RRC signaling through an SRS spatial relation information (SRS-SpatialRelationInfo) parameter for each SRS resource, and an SS/PBCH block, a CSI-RS, or an SRS may be configured as a reference RS.)
TRP: Transmission and Reception Point In order to increase transmission efficiency of scheduling DCI for a PDSCH and/or PUSCH, transmission of a plurality of PDSCHs (or PUSCHs) may be supported through one DCI. For convenience, in this disclosure, a corresponding DCI is referred to as M-DCI, and DCI scheduling a single PDSCH (or PUSCH) is referred to as S-DCI.

For example, scheduling for transmission of a plurality of PDSCHs (or PUSCHs) through one DCI may be configured for a terminal by higher layer signaling (e.g., RRC signaling). Whether to schedule transmission of a plurality of PDSCHs (or PUSCHs) through one DCI may be configured for each of one or more serving cells configured for a terminal. For example, if information for configuring scheduling for transmission of a plurality of PDSCHs (or PUSCHs) through one DCI is provided for a corresponding serving cell, scheduling for transmission of a plurality of PDSCHs (or PUSCHs) through one DCI on the corresponding cell may be configured/supported. On the other hand, if information for configuring scheduling for transmission of a plurality of PDSCHs (or PUSCHs) through one DCI is not provided for a corresponding serving cell, scheduling for transmission of a plurality of PDSCHs (or PUSCHs) through one DCI on the corresponding cell may not be configured/supported.

Here, even for M-DCI, only a single PDSCH may be scheduled or a plurality of PDSCHs may be scheduled depending on the case. For example, in configuring a TDRA entry of M-DCI, only one SLIV may be linked (associated) with a certain row index #A, and a plurality of SLIVs may be linked (associated) with row index #B. Here, when row index #A is indicated in M-DCI, it may mean that the corresponding DCI schedules only a single PDSCH, on the other hand, when row index #B is indicated in M-DCI, it may mean that the corresponding DCI schedules multiple PDSCHs. For convenience, a case in which scheduling is performed through S-DCI and only one PDSCH is scheduled through M-DCI (or when SPS PDSCH release or SCell dormancy is indicated through DCI) is referred to as a single-PDSCH case, and a case in which a plurality of PDSCHs are scheduled through M-DCI is referred to as a multi-PDSCH case.

Therefore, in the present disclosure, a method for configuring a type-1 (i.e., semi-static) or type-2 (i.e., dynamic) HARQ-ACK codebook (HCB) in consideration of a multi-PDSCH case is proposed.

In the NR system, a millimeter wave (mmWave) band (e.g., above 125 or 24 GHz to 52.6 GHz) is defined as a frequency range 2 (FR2). The sub-carrier spacing (SCS) of an SS/PBCH block in the corresponding band may be either 120 or 240 kHz, and the SCS for other signals/channels (e.g., PDCCH, PDSCH, PUSCH, etc.) may be either 60 or 120 kHz.

In a high frequency NR system (e.g., above 52.6 GHz to 71 GHz, referred to as FR3 (or FR2-2) for convenience of description) larger SCSs may be introduced. If scalability of an OFDM symbol duration and a CP length defined in the current NR system is maintained, an OFDM symbol duration and a CP length for each SCS may be defined with lengths as shown in Table 6 below.

TABLE 6

|  | SCS [kHz] | | | |
| --- | --- | --- | --- | --- |
|  | 120 | 240 | 480 | 960 |
| Symbol duration | 8.33 µs | 4.17 µs | 2.08 µs | 1.04 µs |
| CP length | 586 ns | 293 ns | 146 ns | 73 ns |

In the FR3 (or FR2-2) frequency band, PDCCH monitoring may be performed in one slot per a plurality of slots in consideration of monitoring capability of a terminal. An operation of scheduling a plurality of PDSCHs and/or a plurality of PUSCHs through one DCI may be introduced in consideration of the reduced PDCCH monitoring occasion area. However, a PDSCH and/or PUSCH indicated through the DCI may be indicated to be transmitted not only in the FR3 (or FR2-2) but also in another frequency range. That is, M-DCI proposed in the present disclosure is not limited to the NR system operating in FR3 (or FR2-2) and may be applied in other frequency ranges.

Embodiment 1: Time Bundling Configuration Method

Considering 480/960 kHz SCS to be introduced in the FR3 band, in particular, even if a plurality of PDSCHs are scheduled in a plurality of slots through M-DCI, an absolute time of the plurality of PDSCHs may be considerably short. Therefore, since a channel may not change significantly during the corresponding time duration (or the plurality of PDSCHs), decoding success/failure results of the plurality of PDSCHs may be the same. When a time bundling period is configured in consideration of this, a HARQ-ACK payload can be reduced by bundling (i.e., logical AND operation) ARQ-ACK results within the corresponding time duration. Accordingly, a specific time bundling method is proposed.

In other words, when HARQ time bundling is configured for a specific serving cell, a plurality of PDSCHs scheduled on the specific serving cell may be grouped into one or more groups (or it may be referred to as a bundling group, or a HARQ group or a HARQ bundling group, etc.), and HARQ-ACK information is generated for each of the one or more groups.

For example, time bundling may be configured for a terminal by higher layer signaling (e.g., RRC signaling). Whether to time bundling may be configured for each of one or more serving cells configured for a terminal. For example, if information for configuring time bundling is provided for a corresponding serving cell, time bundling may be configured/supported for a plurality of PDSCHs scheduled on the corresponding cell. On the other hand, if information for configuring time bundling is not provided for a corresponding serving cell, time bundling may not be configured/supported for a plurality of PDSCHs scheduled on the corresponding cell.

In the present disclosure, for convenience of description, bundling of HARQ-ACK information for a plurality of PDSCHs is referred to as time bundling, but the present disclosure is not limited thereto, and it may also be referred to as a HARQ bundling, a HARQ-ACK bundling, etc.

Method 1: A time bundling method based on the number of scheduled PDSCHs is proposed. That is, a plurality of PDSCHs may be bundled (grouped) into one or more groups based on the predetermined number of PDSCHs.

Specifically, in a multi-PDSCH case for PDSCHs of M (M is a natural number) or less, the PDSCHs may be bundled into one group, and in a multi-PDSCH case for more than M PDSCHs, the PDSCHs may be divided into two groups and bundled. Here, the M value may be half of a maximum number of PDSCHs that can be scheduled by M-DCI configured in a corresponding cell (or among all cells configured for a terminal) (if a value taken by half is not an integer, it may be converted to an integer through floor operation, ceiling operation, rounding, etc.). Alternatively, the M value may be configured by higher layer signaling. Specifically, when the actual number of scheduled PDSCHs is N (>M), a first M PDSCHs (e.g., M PDSCHs early in a time domain) may be bundled into group 1, and the remaining N-M PDSCHs may be bundled into group 2. Alternatively, a first ceil (N/2) PDSCHs may be bundled into group 1, and the remaining floor (N/2) PDSCHs may be bundled to group 2.

Method 2: A time bundling method based on the number of slots occupied by PDSCHs is proposed. That is, a plurality of PDSCHs may be bundled into one or more groups based on the predetermined number of PDSCH slots.

Specifically, in a multi-PDSCH case for slots of L (L is a natural number) or less, PDSCHs may be bundled into one group, and in a multi-PDSCH case for more than L slots, PDSCHs may be divided into two groups and bundled. Here, the L value may be half of a maximum number of PDSCH slots (i.e., a maximum value among slot durations from the first PDSCH slot to the last PDSCH slot) that can be scheduled by M-DCI configured in a corresponding cell (or among all cells configured for a terminal) (if a value taken by half is not an integer, it may be converted to an integer through floor operation, ceiling operation, rounding, etc.). Alternatively, the L value may be configured by higher layer signaling. Specifically, when a duration of an actual scheduled slots from the first PDSCH slot to the last PDSCH slot is K slots (>L), PDSCHs in a duration of first L slots are bundled into group 1, and PDSCHs in a duration of the remaining K-L slots may be bundled into group 2. Alternatively, PDSCHs in a duration of first ceil (K/2) slots may be bundled into group 1, and PDSCHs in a duration of the remaining floor (K/2) slots may be bundled into group 2.

Method 3: Regardless of the number of PDSCHs and the number of slots, a plurality of PDSCHs may always be time bundled into two groups. When the actual number of scheduled PDSCHs is N, a first ceil (N/2) PDSCHs may be bundled into group 1, and the remaining floor (N/2) PDSCHs may be bundled with group 2.

Alternatively, by extending it further, G (G is a natural number) groups may be configured, and a plurality of PDSCHs may be time bundled (or grouped) into G groups. Here, the plurality of PDSCHs may be mapped to each group (in ascending order of a group index) in an order of a scheduled (or valid) PDSCH (in other words, a plurality of PDSCHs are mapped to each group according to time order, and this process may be cyclically repeated until all PDSCHs are mapped to groups). For example, if 5 PDSCHs are scheduled (or valid) through one DCI and G=4, PDSCH

0/4 may correspond (mapped) to group #0, PDSCH #1 may correspond (mapped) to group #1, PDSCH #2 may correspond (mapped) to group #2 and PDSCH #3 may correspond (mapped) to group #3. Here, a valid PDSCH may mean a PDSCH that does not overlap with a symbol configured as uplink (or flexible) (or a slot including the corresponding symbol) by a parameter for TDD UL-DL common configuration (e.g., tdd-UL-DL-ConfigurationCommon) or a parameter for TDD UL-DL dedicated configuration (e.g., tdd-UL-DL-ConfigurationDedicated). Here, a terminal may perform a logical AND operation for each bundling group (i.e., HARQ-ACK information may be generated for each bundling group).

If a plurality of PDSCHs is mapped to bundling groups in an order of scheduled PDSCHs (that is, regardless of validity of a PDSCH), a valid PDSCH and an invalid PDSCH may coexist (both belong to) or only an invalid PDSCH may exist in a specific bundling group. Here, if a valid PDSCH and an invalid PDSCH coexist in a specific bundling group (if both belong to), a terminal may regard the invalid PDSCH as an ACK and may perform a logical AND operation on the corresponding bundling group. However, when only an invalid PDSCH exists in a specific bundling group, a terminal may regard the invalid PDSCH as a NACK or regard HARQ-ACK information corresponding to the bundling group as a NACK. For example, in the above example, if it is assumed that PDSCH #0 mapped to group #0 is a valid PDSCH and PDSCH #4 mapped to group #0 is an invalid PDSCH (that is, both a valid PDSCH and an invalid PDSCH belong to a specific bundling group), HARQ-ACK information corresponding to PDSCH #4 may be regarded as an ACK. As another example, in the above example, if it is assumed that PDSCH #1 mapped to group #1 is an invalid PDSCH (i.e., only invalid PDSCH exists in a specific bundling group), HARQ-ACK information corresponding to PDSCH #1 may be regarded as a NACK, alternatively, HARQ-ACK information corresponding to the corresponding group #1 may be regarded as a NACK.

The Methods 1 to 3 are mainly described for a case where the number of groups is 2 for convenience of description, but the same methods may be extended and applied even when the number of groups greater than 2 or 1 group is configured.

As previously proposed in the Method 3, the number of bundling groups may be configured, and specifically, it may be as follows.

If a UE is configured with the number of HARQ bundling groups (numberOfHARQ-BundlingGroups) (i.e., if configured the number of HARQ bundling groups through an RRC parameter) for a serving cell c, the UE generates HARQ-ACK information over transport block groups (TBGs) for PDSCH receptions. Here, for a maximum number of $N^{max}_{PDSCH}$ PDSCH receptions scheduled by a DCI format on a serving cell, a maximum number of TBGs $N^{TBG,max}_{HARQ-ACK,c}$ is provided by numberOfHARQ-BundlingGroups. If a UE detects a DCI format scheduling $N_{PDSCH,c}$ PDSCH receptions on a serving cell c, the UE generates $N^{TBG,max}_{HARQ-ACK,c}$ HARQ-ACK information bits for first TBs and, generates $N^{TBG,max}_{HARQ-ACK,c}$ HARQ-ACK information bits for second TBs in $N_{PDSCH,c}$ PDSCH receptions by setting $N^{CBG/TB,max}_{HARQ-ACK} = N^{TBG,max}_{HARQ-ACK,c}$ and $C = N_{PDSCH,c}$. That is, a bundling group may be generated in the same method as a code block group (CBG) construction as follows.

If a UE is configured with CBG transmission of a PDSCH (PDSCH-CodeBlockGroupTransmission) for a serving cell, the UE receives a PDSCH scheduled by DCI format 1_1, that includes CBGs of a transport block. A UE is also configured with a maximum number of CBGs (i.e., provided the maximum number of CBGs per TB (maxCodeBlockGroupsPerTransportBlock) indicating $N^{CBG/TB,max}_{HARQ-ACK}$) for generating respective HARQ-ACK information bits for a transport block reception for a serving cell.

For the number of C code blocks (CBs) in a transport block, a UE determines a number of CBGs M and determines a number of HARQ-ACK bits for a transport block as $N^{CBG/TB}_{HARQ-ACK} = M$.

A UE generates an ACK for a HARQ-ACK information bit of a CBG if the UE correctly received all code blocks of the CBG. A UE generates a NACK for a HARQ-ACK information bit of a CBG if the UE incorrectly received at least one code block of the CBG. If a UE receives two TB, the UE concatenates HARQ-ACK information bits for CBGs of a second TB after HARQ-ACK information bits for CBGs of a first TB.

A HARQ-ACK codebook includes $N^{CBG/TB,max}_{HARQ-ACK}$ HARQ-ACK information bits and, if $N^{CBG/TB}_{HARQ-ACK} < N^{CBG/TB,max}_{HARQ-ACK}$ for a TB, a UE generates a NACK value for the last $N^{CBG/TB,max}_{HARQ-ACK} - N^{CBG/TB}_{HARQ-ACK}$ HARQ-ACK information bits for the TB in the HARQ-ACK codebook.

If a UE generates a HARQ-ACK codebook in response to a retransmission of a TB, corresponding to a same HARQ process as a previous transmission of the TB, the UE generates an ACK for each CBG that the UE correctly decoded in a previous transmission of the TB.

If a UE correctly detects each of $N^{CBG/TB}_{HARQ-ACK}$ CBGs and does not correctly detect the TB for the $N^{CBG/TB}_{HARQ-ACK}$ CBGs, the UE generates a NACK value for each of the $N^{CBG/TB}_{HARQ-ACK}$ CBGs.

Meanwhile, in generating a bundling group, as described above, a bundling group may be generated based on a preconfigured SLIV linked (associated) with TDRA information indicated by DCI. Here, when a valid PDSCH and an invalid PDSCH coexist (or both belong to) or only an invalid PDSCH may exist in a specific bundling group, it is necessary to define a HARQ-ACK generation method for the corresponding bundling group. Here, a valid PDSCH may mean a PDSCH that does not overlap with a symbol (or a slot including the corresponding symbol) configured as uplink (or flexible) by a parameter for TDD UL-DL common configuration (e.g., tdd-UL-DL-ConfigurationCommon) or a parameter for TDD UL-DL dedicated configuration (e.g., tdd-UL-DL-ConfigurationDedicated). On the other hand, an invalid PDSCH may mean a PDSCH overlapping a symbol (or a slot including the corresponding symbol) configured as uplink (or flexible) by a parameter for TDD UL-DL common configuration (e.g., tdd-UL-DL-ConfigurationCommon) or a parameter for TDD UL-DL dedicated configuration (e.g., tdd-UL-DL-ConfigurationDedicated). If a valid PDSCH and an invalid PDSCH coexist (both belong to) in a specific bundling group, HARQ-ACK information corresponding to the bundling group is generated as ACK information when all valid PDSCHs belonging to the bundling group are correctly received, in other cases (i.e., when even one of valid PDSCHs belonging to the corresponding bundling group is not correctly received), it may be desirable to be generate as a NACK. In other words, in generating HARQ-ACK information corresponding to the bundling group (to which both a valid PDSCH and an invalid PDSCH belong), Alternative (Alt) 1: Invalid PDSCH may be considered (or assumed) to be correctly received, or Alt 2: Invalid PDSCH may preferably be ignored (ignore).

As an example, the above content may be reflected in the standard as follows.

Alt 1: If a UE is configured with the number of HARQ bundling groups (numberOfHARQ-BundlingGroups) (i.e., if configured the number of HARQ bundling groups through an RRC parameter) for a serving cell c, the UE generates HARQ-ACK information over transport block groups (TBGs) for PDSCH receptions. Here, for a maximum number of $N^{max}_{PDSCH}$ PDSCH receptions scheduled by a DCI format on a serving cell, a maximum number of TBGs $N^{TBG,max}_{HARQ-ACK,c}$ is provided by numberOfHARQ-BundlingGroups. If a UE detects a DCI format scheduling $N_{PDSCH,c}$ PDSCH receptions on a serving cell c, the UE generates $N^{TBG,max}_{HARQ-ACK,c}$ HARQ-ACK information bits for first TBs and, generates $N^{TBG,max}_{HARQ-ACK,c}$ HARQ-ACK information bits for second TBs in $N_{PDSCH,c}$ PDSCH receptions by setting $N^{CBG/TB,max}_{HARQ-ACK} = N^{TBG,max}_{HARQ-ACK,c}$ and $C = N_{PDSCH,c}$ and by assuming a PDSCH overlapping with a UL symbol indicated by tdd-UL-DL-ConfigurationCommon or tdd-UL-DL-ConfigurationDedicated is correctly received, if any, for a TBG with at least one actual PDSCH reception.

Alt 2: Alt 1: If a UE is configured with the number of HARQ bundling groups (numberOfHARQ-BundlingGroups) (i.e., if configured the number of HARQ bundling groups through an RRC parameter) for a serving cell c, the UE generates HARQ-ACK information over transport block groups (TBGs) for PDSCH receptions. Here, for a maximum number of $N^{max}_{PDSCH}$ PDSCH receptions scheduled by a DCI format on a serving cell, a maximum number of TBGs $N^{TBG,max}_{HARQ-ACK,c}$ is provided by numberOfHARQ-BundlingGroups. If a UE detects a DCI format scheduling $N_{PDSCH,c}$ PDSCH receptions on a serving cell c, the UE generates $N^{TBG,max}_{HARQ-ACK,c}$ HARQ-ACK information bits for first TBs and, generates $N^{TBG,max}_{HARQ-ACK,c}$ HARQ-ACK information bits for second TBs in $N_{PDSCH,c}$ PDSCH receptions by setting $N^{CBG/TB,max}_{HARQ-ACK,c} = N^{TBG,max}_{HARQ-ACK,c}$ and $C = N_{PDSCH,c}$ and by ignoring a PDSCH overlapping with a UL symbol indicated by tdd-UL-DL-ConfigurationCommon or tdd-UL-DL-ConfigurationDedicated, if any, for a TBG with at least one actual PDSCH reception.

Embodiment 2: When Time Bundling is Configured, Type-1 HARQ-ACK Codebook (HCB) Configuration Method HARQ-ACK timing (slot) may be determined by applying a K1 value (indicated by a corresponding DCI) (in this disclosure, K1 means a slot interval between a PDSCH transmission slot and a HARQ-ACK transmission slot for the corresponding PDSCH reception) based on the last PDSCH transmission slot (in time) among a plurality of PDSCHs scheduled from M-DCI. Based on this, HARQ-ACK feedback for all of the plurality of PDSCHs scheduled from the DCI may be collectively transmitted through the corresponding (same one) HARQ-ACK timing.

Accordingly, HARQ-ACK feedback (for all of the multiple PDSCHs scheduled from the corresponding DCIs) may be multiplexed (i.e., HARQ-ACK information bits are included in one codebook) only between M-DCIs indicating the same slot as the HARQ-ACK timing (slot) corresponding to the last PDSCH transmission slot as a HARQ-ACK timing (and S-DCIs indicating the same slot as the HARQ-ACK timing (slot) corresponding to the last PDSCH transmission slot as a HARQ-ACK timing), and may be transmitted through the same one HARQ-ACK timing.

Meanwhile, in a state in which a set of multiple (e.g., K_N) candidate K1 values is configured, in case of the existing Type-1 HCB, a terminal calculates a combination of all PDSCH occasions (SLIVs) that can be transmitted in K1 previous DL slot(s) from a HARQ-ACK transmission slot for each K1 value (configured in a corresponding cell for each serving cell). Then, a terminal configures occasions for candidate PDSCH receptions (including determination of a location/order of a HARQ-ACK bit corresponding to each SLIV) corresponding to each DL slot (this is defined as "SLIV pruning"). HARQ-ACK information bit(s) are constructed for each occasion included in a set of occasions for candidate PDSCH receptions obtained through this process, and an entire HARQ-ACK codebook may be constructed by concatenating each HARQ-ACK information bit(s).

In other words, after configuring a plurality of candidate HARQ timings through RRC signaling in advance, a base station may indicate one of the plurality of candidate HARQ timings to a terminal through (DL grant) DCI. In this case, the terminal may operate to transmit A/N feedback for (the plurality of) PDSCH reception in multiple slots (or slot set) corresponding to the entire candidate HARQ timing set through the indicated HARQ timing. Here, a HARQ timing means PDSCH-to-A/N timing/interval. A HARQ timing may be expressed in units of slots. For example, when A/N transmission is indicated in slot #m, A/N information may include response information for PDSCH reception in slot #(m−i). Here, slot #(m−i) corresponds to a slot corresponding to the candidate HARQ timing. Here, when the candidate HARQ timing is configured to i={2, 3, 4, 5}, when the A/N transmission time is indicated by #(n+5)(=m), the terminal may generate/transmit A/N information (i.e., A/N feedback for all 4 slots) for PDSCH receptions in slots #n~#(n+3)(=m−i). ere, the A/N response to the PDSCH reception of slot #n+1/#n+3 may be processed as a NACK.

Referring to some of the related standards are as follows.

For a serving cell c, an active DL BWP, and an active UL BWP, a UE determines a set of $M_{A,C}$ occasions for candidate PDSCH receptions for which the UE can transmit corresponding HARQ-ACK information in a PUCCH in slot nu. If serving cell c is deactivated, the UE uses as the active DL BWP for determining the set of $M_{A,C}$ occasions for candidate PDSCH receptions a DL BWP provided by firstActiveDownlinkBWP-Id. The determination is based:

a) The determination is based on a set of slot timing values $K_1$ associated with the active UL BWP.

If a UE is configured to monitor PDCCH for DCI format 1_0 and is not configured to monitor PDCCH for either DCI format 1_1 or DCI format 1_2 on serving cell c, $K_1$ is provided by the slot timing values {1, 2, 3, 4, 5, 6, 7, 8}.

If a UE is configured to monitor PDCCH for DCI format 1_1 and is not configured to monitor PDCCH for DCI format 1_2 for serving cell c, $K_1$ is provided by dl-DataToUL-ACK.

If a UE is configured to monitor PDCCH for DCI format 1_2 and is not configured to monitor PDCCH for DCI format 1_1 for serving cell c, $K_1$ is provided by dl-DataToUL-ACK-ForDCIFormat1_2.

If a UE is configured to monitor PDCCH for DCI format 1_1 and DCI format 1_2 for serving cell c, $K_1$ is provided by the union of dl-DataToUL-ACK and dl-DataToUL-ACK-ForDCIFormat1_2.

b) The determination is based on a set of row indexes R of a table that is associated with the active DL BWP and defining respective sets of slot offsets $K_0$, start and length indicators SLIV, and PDSCH mapping types for PDSCH reception. Here, the row indexes R of the table are provided by the union of row indexes of time domain resource allocation tables for DCI formats the UE is configured to monitor PDCCH for serving cell c.

if a UE is provided referenceOfSLIVDCI-1-2, for each row index with slot offset $K_0=0$ and PDSCH mapping Type B in a set of row indexes of a table for DCI format 1_2, for each PDCCH monitoring occasion in a set of PDCCH monitoring occasions with different starting symbols within a slot where the UE monitors PDCCH for DCI format 1_2 and with starting symbol $S_0>0$, if $S+S_0+L \leq 14$ for normal cyclic prefix and $S+S_0+L \leq 12$ for extended cyclic prefix, add a new row index in the set of row indexes of the table by replacing the starting symbol S of the row index by $S+S_0$.

In the present embodiment, a type-1 HCB configuration method is proposed when time bundling is configured as in Embodiment 1 above.

First, SLIV pruning may be performed based on only the last SLIVs (in each row of a TDRA table). That is, a set of occasions for candidate PDSCH receptions capable of transmitting corresponding HARQ-ACK information in PUCCH in a specific slot may be determined based on only the last SLIV of each row in a TDRA table. For example, in one or more rows in a TDRA table, a plurality of SLIV values may be indicated for scheduling of multiple PDSCHs. For example, row index 2: {SLIV 1, SLIV 2, SLIV 3}, row index 3: {SLIV 4, SLIV 5} may be configured/defined. In this case, a set of occasions for candidate PDSCH receptions may be determined based on only the last SLIV of each row in a TDRA table. That is, by considering only row index 2: {SLIV 3}, row index 3: {SLIV 5}, a set of occasions for candidate PDSCH receptions may be determined.

After SLIV pruning is performed on each DL slot corresponding to each K1 in a set of a plurality of candidate K1 values (i.e., slot n-K1 when HARQ-ACK is transmitted in slot n), if HARQ-ACK transmission is required for G groups at any one of TDRA row indexes corresponding to the corresponding K1, the number of occasions as much as (G−1) may be added to the SLIV pruning result. For example, if G=1, occasion does not need to be added to the SLIV pruning result.

For example, a TDRA entry for M-DCI in a specific cell may be as follows.
Row index #0: 5 SLIV values are linked (associated), and the last SLIV={S=0,L=5}
Row index #1: 3 SLIV values are linked (associated), and the last SLIV={S=2,L=5}

In addition, a TDRA entry for S-DCI in the corresponding cell may be as follows.
Row index #0: SLIV={S=9,L=5}

For a corresponding cell, for a specific DL slot corresponding to a specific K1, when SLIV pruning (i.e., determination of a set of occasions for candidate PDSCH receptions) is performed based on only the last SLIVs, 2 occasions for candidate PDSCH receptions may be allocated to the corresponding DL slot (e.g., one occasion for receiving a candidate PDSCH by M-DCI, one occasion for receiving a candidate PDSCH by S-DCI).

As in Method 1 of Embodiment 1, it is assumed that two groups for time bundling are configured and M=4. In this case, when row index #0 is indicated by M-DCI, since a total of 5 PDSCHs are scheduled, the PDSCHs may be bundled into two groups. On the other hand, when row index #1 is indicated by M-DCI, since a total of 3 PDSCHs are scheduled, the PDSCHs may be bundled into one group.

In this case, at least row index #0 requires both groups, so the number of occasions for candidate PDSCH receptions may be 3 in the final corresponding DL slot (For example, two occasions for candidate PDSCH reception by M-DCI (for each group), one occasion for PDSCH reception by S-DCI). If row index #0 or 1 of M-DCI is scheduled, HARQ-ACK information may correspond to the first two occasions within corresponding occasions, where in case of row index #1, NACK may be filled in the second occasion (since there is no PDSCH corresponding to the second group). And when row index #0 of S-DCI is scheduled, HARQ-ACK information may correspond to the third occasion. That is, HARQ-ACK information first may correspond to an occasion(s) for receiving a candidate PDSCH by M-DCI, and then HARQ-ACK information may correspond to an occasion(s) for receiving a candidate PDSCH by S-DCI.

As another example, a TDRA entry for M-DCI in a specific cell may be as follows.
Row index #0: 5 SLIV values are linked (associated), and the last SLIV={S=9,L=5}
Row index #1: 3 SLIV values are linked (associated), and the last SLIV={S=10,L=4}

In addition, a TDRA entry for S-DCI in the corresponding cell may be as follows.
Row index #0: SLIV={S=0,L=5}

For a corresponding cell, for a specific DL slot corresponding to a specific K1, when SLIV pruning (i.e., determination of a set of occasions for candidate PDSCH receptions) is performed based on only the last SLIVs, 2 occasions for candidate PDSCH receptions may be allocated to the corresponding DL slot (e.g., one occasion for receiving a candidate PDSCH by M-DCI, one occasion for receiving a candidate PDSCH by S-DCI).

As in Method 1 of Embodiment 1, it is assumed that two groups for time bundling are configured and M=4. In this case, when row index #0 is indicated by M-DCI, since a total of 5 PDSCHs are scheduled, the PDSCHs may be bundled into two groups. On the other hand, when row index #1 is indicated by M-DCI, since a total of 3 PDSCHs are scheduled, the PDSCHs may be bundled into one group.

In this case, at least row index #0 requires both groups, so the number of occasions for candidate PDSCH receptions may be 3 in the final corresponding DL slot (For example, two occasions for candidate PDSCH reception by M-DCI (for each group), one occasion for PDSCH reception by S-DCI). If row index #0 or 1 of M-DCI is scheduled, HARQ-ACK information may correspond to the first and third occasions within corresponding occasions, where in case of row index #1, NACK may be filled in the third occasion (since there is no PDSCH corresponding to the second group). And when row index #0 of S-DCI is scheduled, HARQ-ACK information may correspond to the second occasion. That is, according to SLIV pruning performed based on only last SLIVs, row index #0 for S-DCI is allocated an occasion first, and row index #0/1 for M-DCI is allocated as the next occasion, so a total of 2 occasions may be configured. Here, an additional occasion due to time bundling is configured before the corresponding two occasions, so that a total of three occasions may be allocated to the corresponding DL slot. In other words, HARQ-ACK information corresponds to occasion(s) for receiving a candidate PDSCH by S-DCI, and then HARQ-ACK information corresponds to occasion(s) for receiving a candidate PDSCH by M-DCI, and if there is an occasion due to time bundling in occasion(s) for receiving a candidate PDSCH by M-DCI, HARQ-ACK information may correspond to it first.

Embodiment 3: When Slot-Group Based PDCCH Monitoring is Configured, Type-1 HCB Configuration Method Since higher SCS such as 480/960 kHz SCS is introduced, performing PDCCH monitoring every slot may be a burden on UE implementation. In consideration of this, slot-group-based PDCCH monitoring may be introduced.

Figure 10:
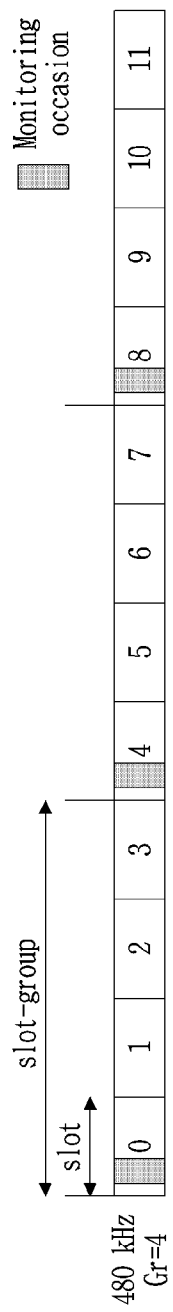
FIG. 10 is a diagram illustrating slot-group-based PDCCH monitoring according to an embodiment of the present disclosure.

FIG. 10 is a diagram illustrating slot-group-based PDCCH monitoring according to an embodiment of the present disclosure.

Referring to FIG. 10, 4 (i.e., Gr=4) slots are defined as one slot-group, and PDCCH monitoring may be to be limited only in some regions (e.g., the first slot) within the corresponding slot-group. This slot-group may be pre-defined (for each SCS), may be configured by higher layer signaling, or may be a value derived by a terminal from a search space set configuration. In addition, a slot-group may be used as a criterion for calculating the maximum number of PDCCH candidates and/or the maximum number of non-overlapped control channel elements (CCEs), and may be used as a criterion for dropping a search space set based on the corresponding number.

According to the present embodiment, SLIV pruning may be performed on an entire slot-group, not on a specific DL slot corresponding to a specific K1, for a corresponding cell. Here, for a multi-PDSCH case having a specific slot among corresponding slot-groups as the first PDSCH slot, a scheduling restriction that is scheduled only in the same slot-group may be configured/defined. That is, for a multi-PDSCH case having a specific slot among the nth slot-group as the first PDSCH slot, a restriction that all PDSCHs scheduled by a corresponding M-DCI should belong to the corresponding nth slot-group and any one PDSCH should not be scheduled to belong to the n+1th slot-group is required. That is, when multi-PDSCHs are scheduled by M-DCI, all of the multi-PDSCHs needs to be scheduled within a single slot-group.

Specifically, for each K1, SLIV pruning may be performed on all slots belonging to a slot-group in which a slot indicated by each K1 becomes the last slot.

Figure 11:
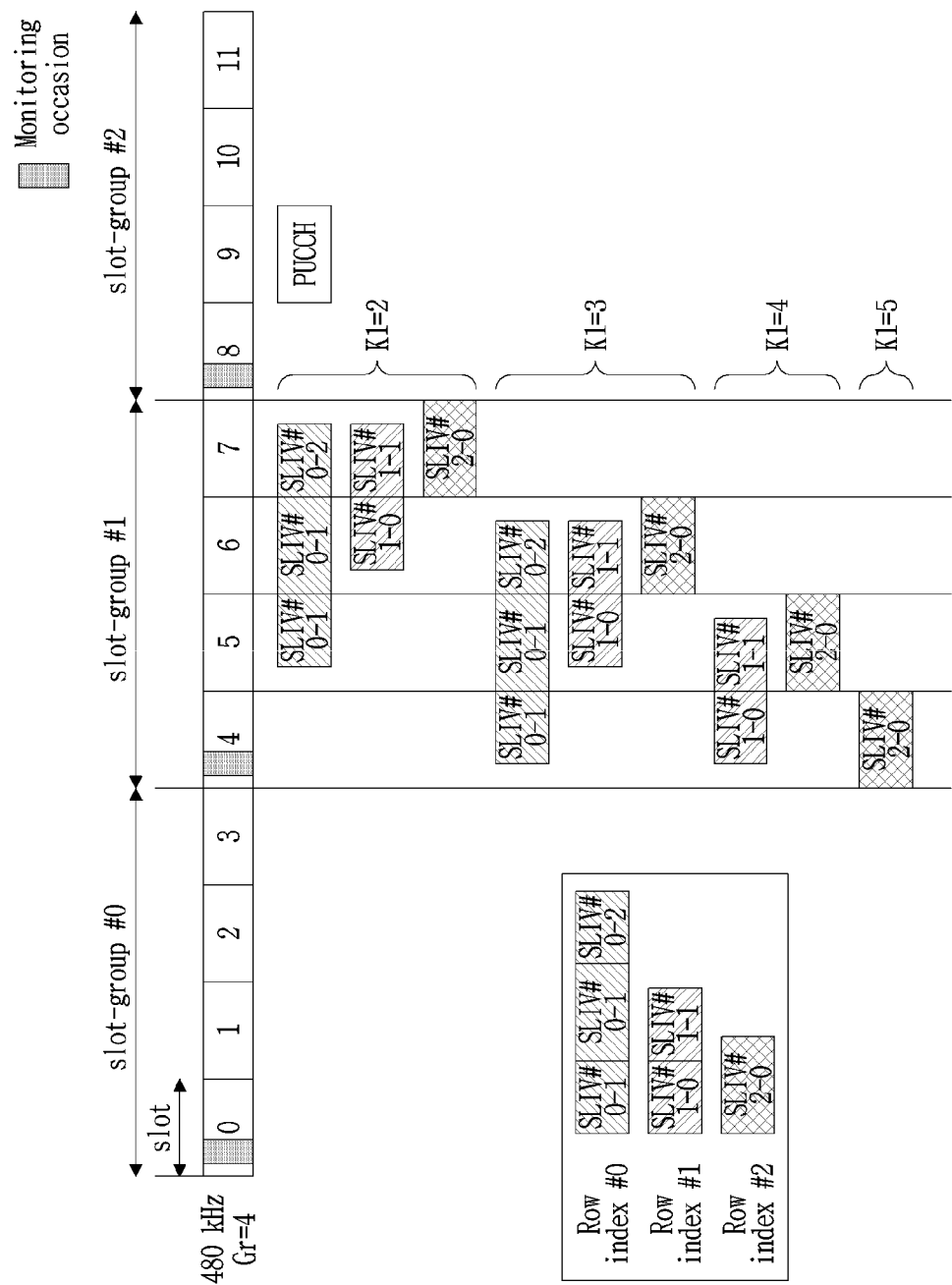
FIG. 11 is a diagram illustrating determination of a set of opportunities for candidate PDSCH receptions according to an embodiment of the present disclosure.

FIG. 11 is a diagram illustrating determination of a set of occasions for candidate PDSCH receptions according to an embodiment of the present disclosure.

In reference to FIG. 11, when slot #9 is a UL slot to which HARQ-ACK is transmitted, K1 set={2,3,4,5,6,7}, and a TDRA entry for M-DCI is configured as row indexes #0, #1, #2, SLIV pruning corresponding to slot-group #1 is exemplified. When K1=2, since the corresponding slot #7 belongs to slot-group #1, SLIV pruning may be performed on the entire K1=2/3/4/5 corresponding to the slot-group #1. That is, row indexes corresponding to each of K1=2/3/4/5 may be arranged as shown in FIG. 11 (under the scheduling restriction). A SLIV pruning process may be performed on all 9 SLIV sequences corresponding to slot-group #1 (replacing an existing slot with a slot-group and all 56 symbols in the corresponding slot-group). As a result, 4 occasions may be allocated to the corresponding slot-group #1. If actual scheduling through M-DCI is to schedule 3 PDSCHs from slot #5 with row index #0, the 2/3/4th occasion of the corresponding occasion may correspond to each PDSCH.

Embodiment 4: Type-2 HCB Configuration Method Considering M-DCI

In case of conventional S-DCI, counter-DAI (C-DAI) and total-DAI (T-DAI) are counted by 1 for each DCI or each PDSCH. On the other hand, in case of M-DCI, since there may be a plurality of PDSCHs corresponding to one DCI, a method for counting the DAI value may vary, and the following method may be considered.

Alt 1: counting DAI (C-DAI and T-DAI) per DCI
Alt 2: counting DAI (C-DAI and T-DAI) per PDSCH Here, if at least one symbol of a specific PDSCH among a plurality of scheduled PDSCHs overlaps with a UL symbol configured for higher layer (e.g., RRC) signaling, the corresponding PDSCH may not be transmitted. In this case, a DAI for the corresponding PDSCH may be omitted without counting.

Alt 3: DAI values are counted for each of W PDSCHs (W is a natural number), where the W value may be configured by higher layer (e.g., RRC) signaling (or may be a fixed value in advance).

Here, when M-DCI is configured for a plurality of cells in the same cell group, a corresponding W value may be preferably configured to a value common to the corresponding cells. This is because by matching a HARQ-ACK structural unit between cells, ambiguity can be eliminated even if a specific DCI is missing.

Hereinafter, C-DAI/T-DAI signaling in DL/UL DCI, HARQ-ACK payload size, HCB (HARQ-ACK codebook) configuration method when a CBG is additionally configured are to be proposed for each alternative in the present embodiment.

In addition, for each alternative, a method of configuring a single CB (codebook) for a single PDSCH case and a multi-PDSCH case and a method of configuring an individual sub-codebook (sub-CB) (i.e., HARQ-ACK sub-codebook) for each is divided and proposed.

In the present disclosure, configuring an individual sub-CB means that a C/T-DAI value is independently determined and signaled for each sub-CB (i.e., an order/total of DCI/PDSCH scheduled for each sub-CB is independently determined/signaled). That is, a C-DAI value and a T-DAI value may be individually applied to each HARQ-ACK sub-codebook.

For example, that an individual sub-CB is configured for a single PDSCH case and a multi-PDSCH case means that a C/T-DAI value is independently determined and signaled for each of the single PDSCH case and the multi-PDSCH case (i.e., it may mean a process in which an order/total of DCI/PDSCH scheduled for each case is independently determined/signaled). In other words, the DCI corresponding to a single PDSCH case determines and signals a DAI value only for the single PDSCH case, and the DCI corresponding to a multi-PDSCH case determines and signals a DAI value only for the multi-PDSCH case. In addition, a final HARQ-ACK codebook (HCB) may be constructed by concatenating HARQ-ACK payloads corresponding to different sub-CBs.

Meanwhile, configuring a single CB may mean that a common C/T-DAI value is determined and signaled as before (i.e., an order/total of DCI/PDSCH scheduled for a single CB is determined/signaled in common). For example, that a single CB is configured for a single PDSCH case and a multi-PDSCH case may mean that C/T-DAI values are counted and signaled by grouping (combining) the single PDSCH case and the multi-PDSCH case (i.e., an order/total of DCI/PDSCH scheduled regardless of each case is determined/signaled).

Embodiment 4-1: DAI Count Per DCI (i.e., Alt 1 in the Above-Described Embodiment 4)+Single HARQ-ACK CB (Codebook) Configuration A terminal may configure/generate one CB for a single PDSCH case and a multi-PDSCH case.

M-DCI: the existing DL DAI size (i.e., 2 bits each for a C/T-DAI) may be maintained.

S-DCI: the existing DL DAI size may be maintained.

UL grant: the existing UL DAI size (i.e., 2 bits for a T-DAI) may be maintained.

HARQ-ACK payload: may be determined by the maximum number of PDSCHs (Y) (Y is a natural number) that M-DCI can schedule. For example, if 2 TB is configured (i.e., PDSCH reception carrying two transport blocks to a corresponding serving cell is configured or a maximum number of schedulable transport blocks (or codewords) by one DCI is set to 2) and spatial bundling for HARQ-ACK information is not configured, 2 bits may be calculated for each PDSCH. For a cell in which 2 TB is configured but spatial bundling is configured or a cell in which 1 TB is configured, 1 bit may be calculated for each PDSCH.

As another example, in case of X bit(s) per PDSCH (as described above, for a cell in which 2 TB is configured and spatial bundling for HARQ-ACK information is not configured, X=2. For a cell in which 2 TB is configured and spatial bundling is configured or for a cell in which 1 TB is configured, X=1), the number of HARQ-ACK bits corresponding to one DAI may be X*Y for both a single PDSCH case and a multi-PDSCH case. If M-DCI is configured for a plurality of cells (in one cell group), the number of HARQ-ACK bits for each DAI may be determined by a maximum X*Y value among any cells. That is, it may be determined as a maximum X*Y value among X*Y values calculated for each cell in a cell group.

Embodiment 4-1a: DAI Count Per DCI (i.e., Alt 1 in the Above-Described Embodiment 4)+Single HARQ-ACK CB (Codebook) Configuration+when CBG is Configured 1) Option 1: A terminal may configure/generate an individual sub-CB. That is, one sub-CB may be configured for a case of TB-based PDSCH scheduling in a single PDSCH case and a multi-PDSCH case. In addition, another sub-CB may be configured for CBG-based PDSCH scheduling through a single PDSCH case.

When a CBG is configured in a cell in which M-DCI is configured, a DAI in M-DCI may indicate a C/T-DAI value for a CBG-based PDSCH in a single-PDSCH case. When a CBG is not configured in a cell in which M-DCI is configured, a DAI in M-DCI may indicate a C/T-DAI value for a TB-based PDSCH in a single-PDSCH case.

S-DCI or M-DCI: the existing DL DAI size may be maintained.

UL grant: 2 bits for a T-DAI (for a sub-CB for a CBG) may be additionally required to the existing UL DAI size.

HARQ-ACK payload: A payload of one sub-CB configured for a case of TB-based PDSCH scheduling in a single PDSCH case and a multi-PDSCH case may be configured/determined in the same method as in Embodiment 4-1. In addition, in a single PDSCH case, a payload of another sub-CB configured for CBG-based PDSCH scheduling may be the same as that of the existing CBG-based sub-CB configuration.

2) Option 2: A single sub-CB may be configured. That is, one sub-CB may be configured for a case of TB-based or CBG-based PDSCH scheduling in a single PDSCH case and a multi-PDSCH case.

Regardless of whether a CBG is configured in a cell in which M-DCI is configured, a DAI in M-DCI may indicate a C/T-DAI value for a single CB even in a single-PDSCH case.

S-DCI or M-DCI or UL grant: In the same method as in Embodiment 4-1, a DAI size may be maintained.

HARQ-ACK payload: When the configured maximum number of CBGs is C (C is a natural number), a payload size may be configured/determined by a maximum value between a maximum C value (max_C) among any cells (in one cell group) and a maximum X*Y value (max_XY) (derived in Embodiment 4-1 above) among any cells (in one cell group). That is, the number of HARQ-ACK bits corresponding to one DAI may be max{max_C, max_XY} for both a single PDSCH case and a multi-PDSCH case.

Embodiment 4-1b: DAI Count Per DCI (i.e., Alt 1 in the Above-Described Embodiment 4)+Single HARQ-ACK CB (Codebook) Configuration+when Time Bundling is Configured When time bundling is configured for one or more serving cells (all or part of) configured in a terminal as in Embodiment 1, a type-2 HCB configuration is proposed.

M-DCI or S-DCI or UL grant: As in the above Embodiment 4-1, a DAI size may be maintained.

HARQ-ACK payload: A HARQ-ACK payload size may be determined by the (maximum) group number (G) (G is a natural number) configured for time bundling.

For example, the number of HARQ-ACK bits corresponding to one DAI, for both a single PDSCH case and a multi-PDSCH case, may be G (or X*G) (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

If M-DCI is configured for a plurality of cells (in one cell group), the number of HARQ-ACK bits for each DAI may be determined by a maximum G (or X*G) value among any cells. That is, G (or X*G) is compared for each cell in a cell group, and the number of HARQ-ACK bits for each DAI may be determined based on a maximum G (or X*G) value.

If there is no PDSCH corresponding to a specific time bundling group (especially when a value of G is 2 or more), a NACK may be mapped. For example, if G=1, the number of HARQ-ACK bits corresponding to one DAI, for both a single PDSCH case and a multi-PDSCH case, may be 1 (or X) (e.g., the X value may be 2 or 1 based on whether 2 TB is configured in a corresponding serving cell (i.e., whether PDSCH reception carrying two transport blocks is configured, or a maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1). Alternatively, if G=1 is configured for all cells (within the same PUCCH cell group) in which M-DCI is configured, a single CB may be configured for a single PDSCH case and a multi-PDSCH case.

When time bundling is configured as in the corresponding method, a terminal may construct/generate a single CB for a single PDSCH case and a multi-PDSCH case. In this case, if a CBG is configured in a specific serving cell within the same PUCCH group, an individual sub-CB may be configured. In other words, as in Option 1 of Embodiment 4-1a, one sub-CB may be configured for a case of TB-based PDSCH scheduling in a single PDSCH case and a multi-PDSCH case (time bundling is configured). In addition, another sub-CB may be configured for CBG-based PDSCH scheduling through a single PDSCH case. In this case, a detailed DCI and HARQ-ACK payload configuration method may be as follows.

When a CBG is configured in a cell in which M-DCI is configured, a DAI in M-DCI may indicate a C/T-DAI value for a CBG-based PDSCH in a single-PDSCH case. When a CBG is not configured in a cell in which M-DCI is configured, a DAI in M-DCI may indicate a C/T-DAI value for a TB-based PDSCH in a single-PDSCH case.

S-DCI or M-DCI: the existing DL DAI size may be maintained.

UL grant: 2 bits of T-DAI (for a sub-CB for a CBG) may be additionally required to the existing UL DAI size.

HARQ-ACK payload: A payload of one sub-CB configured for a case of TB-based PDSCH scheduling in a single PDSCH case and a multi-PDSCH case may be the same as the case in which a CBG is not configured in Embodiment 4-1b above (i.e., the number of HARQ-ACK bits corresponding to one DAI, for both a single PDSCH case and a multi-PDSCH case, may be G or X*G (e.g., the X value may be 2 or 1 based on whether 2 TB is configured in a corresponding serving cell (i.e., whether PDSCH reception carrying two transport blocks is configured, or a maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1). A payload of another sub-CB configured for CBG-based PDSCH scheduling through a single PDSCH case may be the same as that of the existing CBG-based sub-CB configuration.

Alternatively, when both M-DCI and a CBG are configured in the same PUCCH group, a rule may be configured to automatically apply time bundling to a multi-PDSCH case (here, the G value may be defined in advance (e.g., G=1) or configured by the base station). Here, it may be defined/configured to configure a single CB for a single PDSCH case and a multi-PDSCH case.

Embodiment 4-2: DAI Count Per DCI (i.e., Alt 1 in the Above-Described Embodiment 4)+Individual HARQ-ACK Sub-CB (Codebook) Configuration A terminal may configure/generate one sub-CB corresponding to a single PDSCH case and configure/generate another sub-CB corresponding to a multi-PDSCH case.

M-DCI: the existing DL DAI size (i.e., 2 bits each for C/T-DAI) may be maintained.

S-DCI: the existing DL DAI size may be maintained.

UL grant: 2 bits for a T-DAI (for additional sub-CB) may be additionally required to the existing UL DAI size.

HARQ-ACK payload: The number of HARQ-ACK bits for each sub-CB DAI corresponding to a single PDSCH case is X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1), and the number of HARQ-ACK bits for each sub-CB DAI corresponding to a multi-PDSCH case is a maximum X*Y value among any cells (in one cell group). That is, it may be determined as a maximum X*Y value among X*Y values calculated for each cell in a cell group.

Embodiment 4-2a: DAI Count Per DCI (i.e., Alt 1 in the Above-Described Embodiment 4)+Individual HARQ-ACK Sub-CB (Codebook) Configuration+when CBG is Configured 1) Option 1: A terminal may configure/generate an individual sub-CB. (That is, a first sub-CB may be configured for a case of TB-based PDSCH scheduling in a single PDSCH case, a second sub-CB may be configured for a multi-PDSCH case, and a third sub-CB may be configured for a case of CBG-based PDSCH scheduling through a single PDSCH case.)

When a CBG is configured in a cell in which M-DCI is configured, a DAI in M-DCI may indicate a C/T-DAI value for a CBG-based PDSCH in a single-PDSCH case. When a CBG is not configured in a cell in which M-DCI is configured, a DAI in M-DCI may indicate a C/T-DAI value for a TB-based PDSCH in a single-PDSCH case.

S-DCI or M-DCI: the existing DL DAI size may be maintained.

UL grant: 4 bits for a T-DAI (for additional two sub-CBs) may be additionally required to the existing UL DAI size. (that is, each 2 bits for a T-DAI per sub-CB are added.)

HARQ-ACK payload: When TB-based PDSCH scheduling is performed in a single PDSCH case, a payload of a first sub-CB may be the same as the sub-CB corresponding to a single PDSCH case of Embodiment 4-2. A payload of a second sub-CB configured for a multi-PDSCH case may be the same as the sub-CB corresponding to a multi-PDSCH case of Embodiment 4-2. A payload of a third sub-CB configured for CBG-based PDSCH scheduling in a single PDSCH case may be the same as that of the existing CBG-based sub-CB configuration.

2) Option 2: A terminal may configure/generate a first sub-CB for TB-based PDSCH scheduling in a single PDSCH case, and may configure/generate a second sub-CB integrating CBG-based PDSCH scheduling through a single PDSCH case and a multi-PDSCH case.

When a CBG is configured in a cell in which M-DCI is configured, a DAI in M-DCI may indicate a C/T-DAI value for a second sub-CB in a single-PDSCH case. When a CBG is not configured in a cell in which M-DCI is configured, a DAI in M-DCI may indicate a C/T-DAI value for a first sub-CB in a single-PDSCH case.

S-DCI or M-DCI or UL grant: It may be the same as that of Embodiment 4-2.

HARQ-ACK payload: When the configured maximum number of CBGs is C (C is a natural number), a payload size may be configured/determined by a maximum value between a maximum C value (max_C) among any cells (in one cell group) and a maximum X*Y value (max_XY) (derived in Embodiment 4-2 above) among any cells (in one cell group). That is, the number of HARQ-ACK bits corresponding to a second sub-CB DAI may be max{max_C, max_XY} for both a single PDSCH case and a multi-PDSCH case. In addition, the number of HARQ-ACK bits for each first sub-CB DAI may be X (X=1 or 2 according to the number of TBs and spatial bundling configuration as described above).

3) Option 3: M-DCI and a CBG in the same PUCCH group may not be allowed to be configured at the same time (together). Alternatively, when type-1 HARQ-ACK CB is configured for a cell in which M-DCI is configured (or when type-2 HARQ-ACK CB is not configured for the cell), CBG configuration may be allowed for other cells (not the cell) in the same PUCCH group.

Option 1 and/or the option 2 is supported as an optional UE feature, and option 3 may be defined/configured to operate as default for a terminal being not support option 1 and/or option 2. That is, for a terminal that does not support option 1 and/or option 2, it may expect that M-DCI and a CBG in the same PUCCH group are not configured at the same time (together).

For which method of option 1 and option 2 is applied (for a terminal supporting both the option 1 and option 2), it may be configured through higher layer signaling (e.g., RRC signaling, MAC CE, etc.). Alternatively, based on a size between a maximum number of CBGs (i.e., the max_C) and a maximum number of PDSCHs or TBs (i.e., the max_XY), it may be determined whether to apply option 1 or option 2, and accordingly, it is possible to prevent an overall codebook size from greatly increasing. For example, if the max_C value and the max_XY value are the same, a codebook size increase is not large even if the same CB is configured, so option 2 may be applied, otherwise option 1 may be applied. As another example, if difference between the max_C value and the max_XY value is less than or equal to K (the K value is predefined (e.g., K=4) or may be configured by higher layer signaling), option 2 may be applied, otherwise option 1 may apply.

Embodiment 4-2b: DAI Count Per DCI (i.e., Alt 1 in the Above-Described Embodiment 4)+Individual HARQ-ACK Sub-CB (Codebook)+when Time Bundling is Configured When time bundling is configured for one or more serving cells (all or part of) configured in a terminal as in Embodiment 1, a type-2 HCB configuration is proposed.

M-DCI or S-DCI or UL grant: As in the above Embodiment 4-1, a DAI size may be maintained.

HARQ-ACK payload for sub-CB corresponding to multi-PDSCH case: It may be determined by the (maximum) number of groups (G) (G is a natural number) configured for time bundling.

For example, the number of HARQ-ACK bits corresponding to one DAI may be G (or X*G) (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

If M-DCI is configured for a plurality of cells (in one cell group), the number of HARQ-ACK bits for each DAI may be determined by a maximum G (or X*G) value among any cells. That is, G (or X*G) is compared for each cell in a cell group, and the number of HARQ-ACK bits for each DAI may be determined based on a maximum G (or X*G) value.

If there is no PDSCH corresponding to a specific time bundling group, a NACK may be mapped. Here, for a cell in which M-DCI is configured but time bundling is not configured, the G value may be substituted with the maximum number of PDSCHs (Y) that can be scheduled by corresponding M-DCI (Y is a natural number).

In other words, among a plurality of cell(s) in which M-DCI is configured (in the same single PUCCH cell group), for cell(s) in which time bundling is not configured or for cell(s) in which time bundling is configured and G (=the number of PDSCH groups for which time bundling is performed) greater than 1 is configured, the number of HARQ-ACK bits for each DAI may be determined by a maximum value among Q values calculated for each cell (e.g., the number of HARQ-ACK bits corresponding to one DCI or one DAI value when configuring a HARQ-ACK codebook).

Here, in case of cell(s) in which M-DCI is configured but time bundling is not configured, the Q value may be calculated as the product of a maximum number of PDSCHs that can be scheduled by M-DCI and X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

Alternatively, in case of cell(s) in which M-DCI is configured and time bundling is configured with a G value greater than 1, the Q value may be calculated as the product of G and X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

HARQ-ACK payload for sub-CB corresponding to single PDSCH case: The number of HARQ-ACK bits for each sub-CB DAI corresponding to a single PDSCH case is X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

If G=1 is configured for any cell among cells in which M-DCI is configured, a HARQ-ACK bit corresponding to M-DCI of a corresponding cell may be carried in a sub-CB corresponding to a single PDSCH case (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1). That is, one CB may be configured for a multi-PDSCH case of a cell(s) in which a single PDSCH case and M-DCI are configured and G=1 is configured.

Meanwhile, in configuring a HARQ-ACK codebook and DAI signaling through DCI, independent DAI signaling may be performed (i.e., a C-DAI and a T-DAI are individually applied to each HARQ-ACK sub-codebook) and an individual HARQ-ACK sub-codebook may be configured between the following two PDSCH types.

PDSCH type 1: M-DCI-based PDSCH transmission for which timing bundling is not configured (i.e., PDSCHs scheduled on one or more cells in which M-DCI-based scheduling is configured but time bundling is not configured), and M-DCI-based PDSCH transmission for which a G value (=the number of PDSCH groups for which time bundling is performed) greater than 1 is configured (i.e., PDSCHs scheduled on one or more cells in which M-DCI-based scheduling is configured and time bundling is configured with a G value greater than 1).

PDSCH type 2: M-DCI-based PDSCH transmission for which G=1 is configured (i.e., PDSCHs scheduled on one or more cells in which M-DCI-based scheduling is configured and time bundling is configured with G=1), and existing S-DCI-based PDSCH transmission (i.e., PDSCH scheduled on one or more cells in which M-DCI-based scheduling is not configured).

In other words, with respect to the PDSCH type 1, for PDSCHs scheduled on one or more first serving cells in which i) M-DCI-based scheduling is configured, but time bundling is not configured, or ii) M-DCI-based scheduling is configured, and time bundling is configured with a G value greater than 1, a first HARQ-ACK sub-codebook may be generated. In addition, with respect to the PDSCH type 2, for PDSCHs scheduled on one or more second t serving cells in which i) M-DCI-based scheduling is configured, time bundling is configured with G=1, or ii) M-DCI-based scheduling is not configured, a second HARQ-ACK sub-codebook may be generated. Here, a plurality of serving cells configured in a terminal may correspond to the sum of the one or more first serving cells and the one or more second serving cells.

In this case, individual (UL) DAI field/information for each of PDSCH types 1 and 2 may be configured/indicated in UL DCI. If PDSCH type 1 as described above does not exist, DAI signaling may be performed only for PDSCH type 2, a HARQ-ACK codebook may be configured only for PDSCH type 2, and only UL DAI field/information for PDSCH type 2 may be configured/indicated in UL DCI.

Alternatively, independent DAI signaling may be performed between the following two PDSCH types and an individual HARQ-ACK sub-codebook may be configured. The Y value below may be configured/defined as 2.

PDSCH type 1: M-DCI-based PDSCH transmission in which the Q value exceeds Y.

PDSCH type 2: M-DCI-based PDSCH transmission in which the Q value is Y or less, and M-DCI-based PDSCH transmission configured with G=1, and existing S-DCI-based PDSCH transmission.

In this case, individual UL DAI field/information for each of PDSCH types 1 and 2 may be configured/indicated in UL DCI. If PDSCH type 1 as described above does not exist, DAI signaling may be performed only for PDSCH type 2, a HARQ-ACK codebook may be configured only for PDSCH type 2, and only UL DAI field/information for PDSCH type 2 may be configured/indicated in UL DCI.

Embodiment 4-3: DAI Count Per PDSCH (i.e., Alt 2 in the Above-Described Embodiment 4)+Single HARQ-ACK CB (Codebook) Configuration A terminal may configure/generate one CB for a single PDSCH case and a multi-PDSCH case.

M-DCI: It may be increased (increased for each C/T-DAI) by ceiling{log 2 (a maximum value among N_max values for each CC (or BWP) configured in the same cell group)} to the existing DL DAI size (i.e., 2 bits each for a C/T-DAI). Here, N_max is a maximum number of schedulable PDSCHs through M-DCI for a specific cell.

S-DCI: It may be increased (increased for each C/T-DAI) by ceiling {log 2 (a maximum value among N_max values for each CC (or BWP) configured in the same cell group)} to the existing DL DAI size. Here, N_max is a maximum number of schedulable PDSCHs through M-DCI for a specific cell.

Here, it is assumed that a DAI increment amount, ceiling{log 2 (a maximum value among N_max values for each CC (or BWP) configured in the same cell group)}, is A. Once a DL DAI of fallback DL DCI (i.e., DCI format 1_0) is maintained as 2-bit as before, a method of increasing an interval between indicated DAI values to 2^A may be considered. This is because it is not desirable to increase a DCI size in consideration of reliability of fallback DL DCI. For example, if the DAI increment amount is 2-bit, 2^A=4, so a 2-bit DAI value indicated by fallback DCI may be scaled by 2^A with {4, 8, 12, 16} (instead of {1,2,3,4}). For this reason, if a previous C-DAI value is 5 and a C-DAI value indicated by corresponding fallback DL DCI is 8, a terminal may map HARQ-ACK information corresponding to C-DAI=6,7 to a NACK.

Alternatively, it is assumed that a DAI increment amount, ceiling {log 2 (a maximum value among N_max values for each CC (or BWP) configured in the same cell group)}, is A. Once a DL DAI of fallback DL DCI (i.e., DCI format 1_0) is maintained as 2-bit as before, a counting step of a corresponding DAI may also be increased by 1 as before. Here, multi-PDSCH scheduling DCI (or DCI in which a DL DAI size is increased by A) and fallback DCI (or DCI in which a DL DAI size is maintained the same as before) may be restricted so as not to indicate the same PUCCH slot. For example, multi-PDSCH scheduling DCI (or DCI in which a DL DAI size is increased by A) may be allowed to indicate the same PUCCH slot only as non-fallback DCI (or DCI in which a DL DAI size is increased by A) of the same/different cell. In other words, multi-PDSCH scheduling DCI (or DCI in which a DL DAI size is increased by A) may not be allowed to indicate the same PUCCH slot as fallback DCI (or DCI in which a DL DAI size is maintained as before) of the same/different cell. Here, only both fallback DCI (or DCI in which a DL DAI size is maintained the same as before) and non-fallback DCI of the same/different cell (or DCI in which a DL DAI size is increased by A or DCI other than multi-PDSCH scheduling DCI among DCI in which a DL DAI size is increased by A) may indicate the same PUCCH slot. However, in this case, a DAI field (although a size is as large as A) of non-fallback DCI (or DCI in which a DL DAI size is increased by A or DCI other than multi-PDSCH scheduling DCI among DCI in which a DL DAI size is increased by A) may be specified/configured to indicate only values from 1 to 4 (e.g., among 2+A bits, only the most significant bit (MSB) or least significant bit (LSB) 2 bits are valid and the remaining bit(s) are ignored).

Alternatively, it is assumed that a DAI increment amount, ceiling {log 2 (a maximum value among N_max values for each CC (or BWP) configured in the same cell group)}, is A. Once a DL DAI of fallback DL DCI (i.e., DCI format 1_0) is maintained as 2-bit as before, a counting step of a corresponding DAI may also be increased by 1 as before. Here, a separate PUCCH may be limited to be indicated only for PDSCHs scheduled with fallback DCI (or DCI in which a DL DAI size is maintained the same as before). In other words, a terminal may expect that a PUCCH resource (especially time resource) indicated in multi-PDSCH scheduling DCI (or DCI in which a DL DAI size is increased by A) and a PUCCH resource (especially time resource) indicated by fallback DCI (or DCI in which a DL DAI size is maintained the same as before) do not overlap. For example, multi-PDSCH scheduling DCI may be allowed to indicate the same PUCCH slot only with non-fallback DCIS of the same/different cell. In other words, fallback DCI may not be allowed to indicate the same PUCCH slot as multi-PDSCH scheduling DCI or non-fallback DCI.

UL grant: It may be increased by ceiling {log 2 (a maximum value among N_max values for each CC (or BWP) configured in the same cell group)} to the existing UL DAI size (i.e., 2 bits for T-DAI). Here, N_max is a maximum number of schedulable PDSCHs through M-DCI for a specific cell, and the corresponding increase should be applied to all cells in which M-DCI is configured or not. That is, if M-DCI is configured even for at least one serving cell in the same cell group, the corresponding increase is applied to UL grants for all serving cells in the same cell group.

HARQ-ACK payload: The number of HARQ-ACK bits per DAI may be X bits (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

Embodiment 4-3a: DAI Count Per PDSCH (i.e., Alt 2 in the Above-Described Embodiment 4)+Single HARQ-ACK CB (Codebook) Configuration+when CBG is Configured A UE may configure/generate an individual sub-CB. (i.e., one sub-CB may be configured for TB-based PDSCH scheduling in a single PDSCH case and a multi-PDSCH case, and another sub-CB may be configured for CBG-based PDSCH scheduling through a single PDSCH case.)

S-DCI: In case of a cell in which a CBG is configured without M-DCI configuration, a DL DAI size in a non-fallback DCI format (i.e., DCI format 1_1 or 1_2) option 1-1) may be increased as Embodiment 4-3, or option 1-2) may be maintained as 2-bit as before. In case of a cell in which a CBG is configured without M-DCI configuration, a DL DAI size in a fallback DCI format (i.e., DCI format 1_0) may be increased as in Embodiment 4-3 or maintained as 2-bit. In case of a cell in which M-DCI is configured and a CBG is also configured, a DL DAI size may be increased as in Embodiment 4-3.

M-DCI (case 1): In case of a cell in which M-DCI is configured and a CBG is not configured, a DL DAI size may be increased as in Embodiment 4-3. Here, in a single-PDSCH case, a DAI in multi-TTI DCI (e.g., multi-PDSCH DCI) may indicate a C/T-DAI value for a TB-based PDSCH.

M-DCI (case 2): In case of a cell in which M-DCI is configured and a CBG is also configured, in a state in which a DL DAI size in DCI is increased to M_1-bit (≥2) (as in Embodiment 4-3), option 2-1) M_1-bit may indicate a C/T-DAI value (particularly in case of the option 1-1), or option 2-2) 2-bit may indicate a C/T-DAI value (particularly in case of the option 1-2). Characteristically, in case of option 2-2, according to a TDRA field check (if a single PDSCH case), a DL DAI field size itself may be reduced to 2-bits each of C/T-DAI. (Conversely, in case of a multi-PDSCH case according to a TDRA field check, a DL DAI field size may be M_1-bit.) Here, in a single-PDSCH case, a DAI in multi-TTI DCI (e.g., multi-PDSCH DCI) may indicate a C/T-DAI value for a CBG-based PDSCH.

UL grant: In addition to a DAI size for UL grant of Embodiment #4-3, 2 bits for a T-DAI (for a sub-CB for a CBG) may be additionally required. That is, if a CBG is configured even for at least one serving cell in the same cell group, the corresponding increase may be applied to UL grant for all serving cells in the same cell group.

HARQ-ACK payload: A payload of one sub-CB configured for a case of TB-based PDSCH scheduling in a single PDSCH case and a multi-PDSCH case may be the same as in Embodiment 4-3. A payload of another sub-CB configured for CBG-based PDSCH scheduling through a single PDSCH case may be the same as that of the existing CBG-based sub-CB configuration.

Embodiment 4-3b: DAI Count Per PDSCH (i.e., Alt 2 in the Above-Described Embodiment 4)+Single HARQ-ACK CB (Codebook) Configuration+when Time Bundling is Configured When time bundling is configured for one or more serving cells (all or part of) configured in a terminal as in Embodiment 1, a type-2 HCB configuration is proposed.

M-DCI: It may be the same as in Embodiment 4-3 or may be increased (increased for each C/T-DAI) by ceiling{log 2 (a maximum value among G_max values for each CC (or BWP) configured in the same cell group)} to the existing DL DAI size (i.e., 2 bits each for a C/T-DAI). In this case, G_max is the number of groups for (maximum) time bundling configured in a specific cell.

S-DCI: It may be the same as in Embodiment 4-3 or may be increased (increased for each C/T-DAI) by ceiling {log 2 (a maximum value among G_max values for each CC (or BWP) configured in the same cell group)} to the existing DL DAI size. Here, G_max is the number of groups for (maximum) time bundling configured in a specific cell.

Here, it is assumed that a DAI increment amount, ceiling{log 2 (a maximum value among N_max or G_max values for each CC (or BWP) configured in the same cell group)}, is A. Once a DL DAI of fallback DL DCI (i.e., DCI format 1_0) is maintained as 2-bit as before, a method of increasing an interval between indicated DAI values to 2^A may be considered. This is because it is not desirable to increase a DCI size in consideration of reliability of fallback DL DCI. For example, if the DAI increment amount is 1-bit, 2^A=2, so a 2-bit DAI value indicated by fallback DCI may be scaled by 2^A with {2, 4, 6, 8} (instead of {1,2,3,4,}). For this reason, if a previous C-DAI value is 2 and a C-DAI value indicated by corresponding fallback DL DCI is 4, a terminal may map HARQ-ACK information corresponding to C-DAI=3 to a NACK.

UL grant: It may be the same as in Embodiment 4-3 or may be increased by ceiling {log 2 (a maximum value among G_max values for each CC (or BWP) configured in the same cell group)} to the existing UL DAI size (i.e., 2 bits for T-DAI). Here, G_max is the number of groups for (maximum) time bundling configured in a specific cell, and the corresponding increase should be applied to all cells in which M-DCI is configured or not. That is, if M-DCI is configured even for at least one serving cell in the same cell group, the corresponding increase may be applied to UL grants for all serving cells in the same cell group.

HARQ-ACK payload: If a DAI size for the M-DCI, S-DCI, and UL grant follows Embodiment 4-3, a HARQ-ACK payload may be configured by bundling PDSCHs corresponding to G_max (or G allocated to each cell) DAIS. Alternatively, if a DAI size for the M-DCI, S-DCI, and UL grant is determined based on G_max, 1 bit of HARQ-ACK may be configured for each DAI.

Embodiment 4-4: DAI Count Per PDSCH (i.e., Alt 2 in the Above-Described Embodiment 4)+Individual HARQ-ACK Sub-CB (Codebook)

A terminal may configure/generate one sub-CB corresponding to a single PDSCH case and configure/generate another sub-CB corresponding to a multi-PDSCH case.

M-DCI: It may be increased (increased for each C/T-DAI) by ceiling{log 2 (a maximum value among N_max values for each CC (or BWP) configured in the same cell group)} to the existing DL DAI size (i.e., 2 bits each for a C/T-DAI). Here, N_max is a maximum number of schedulable PDSCHs through M-DCI for a specific cell.

S-DCI: The existing DL DAI size may be maintained. This should be applied to both cells in which M-DCI is configured or not.

UL grant: Z (Z is a natural number) bit for a T-DAI (for additional sub-CB) may be additionally required to the existing UL DAI size. Here, Z=ceiling{log 2 (a maximum value among N_max values for each CC (or BWP) configured in the same cell group)}. Here, N_max is the maximum number of schedulable PDSCHs through M-DCI for a specific cell, and the corresponding increase should be applied to all cells in which M-DCI is configured or not. That is, if M-DCI is configured even for at least one serving cell in the same cell group, the corresponding increase may be applied to UL grant for all serving cells in the same cell group.

HARQ-ACK payload: The number of HARQ-ACK bits per sub-CB DAI corresponding to a single PDSCH case may be X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1). The number of HARQ-ACK bits for each sub-CB DAI corresponding to a multi-PDSCH case may also be X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

Embodiment 4-4a: DAI Count Per PDSCH (i.e., Alt 2 in the Above-Described Embodiment 4)+Individual HARQ-ACK Sub-CB (Codebook)+when CBG is Configured A terminal may configure/generate an individual sub-CB. (That is, a first sub-CB may be configured for a case of TB-based PDSCH scheduling in a single PDSCH case, a second sub-CB may be configured for a multi-PDSCH case, and a third sub-CB may be configured for a case of CBG-based PDSCH scheduling through a single PDSCH case.)

S-DCI: In case of a cell in which a CBG is configured without M-DCI configuration, a DL DAI size in a non-fallback DCI format (i.e., DCI format 1_1 or 1_2) may be maintained as 2-bit as before. In case of a cell in which a CBG is configured without M-DCI configuration, a DL DAI size in a fallback DCI format (i.e., DCI format 1_0) may be maintained as 2-bit. In case of a cell in which M-DCI is configured and a CBG is also configured, a DL DAI size may be maintained as in Embodiment 4-4.

M-DCI (case 1): In case of a cell in which M-DCI is configured and a CBG is not configured, a DL DAI size may be increased as in Embodiment 4-4. Here, in a single-PDSCH case, a DAI in multi-TTI DCI (e.g., multi-PDSCH DCI) may indicate a C/T-DAI value for a TB-based PDSCH.

M-DCI (case 2): In case of a cell in which M-DCI is configured and a CBG is also configured, in a state in which a DL DAI size in DCI is increased to M_2-bit (>2) (as in Embodiment 4-4), 2-bit may indicate a C/T-DAI value. Characteristically, according to a TDRA field check (if a single PDSCH case), a DL DAI field size itself may be reduced to 2-bits each of C/T-DAI. (Conversely, in case of a multi-PDSCH case according to a TDRA field check, a DL DAI field size may be M_2-bit.) Here, in a single-PDSCH case, a DAI in multi-TTI DCI (e.g., multi-PDSCH DCI) may indicate a C/T-DAI value for a CBG-based PDSCH.

UL grant: In addition to a UL DAI size of Embodiment #4-4, 4 bits for a T-DAI (for additional 2 sub-CBs) may be additionally required. (i.e., 2 bits of a T-DAI for each sub-CB are added)

HARQ-ACK payload: In case of TB-based PDSCH scheduling in a single PDSCH case, a payload of a first sub-CB may be the same as a sub-CB corresponding to a single PDSCH case of Embodiment 4-4. A payload of a second sub-CB configured for a multi-PDSCH case may be the same as a sub-CB corresponding to a multi-PDSCH case of Embodiment 4-4. A payload of a third sub-CB configured for CBG-based PDSCH scheduling through a single PDSCH case may be the same as that of the existing CBG-based sub-CB configuration.

Embodiment 4-4b: DAI Count Per PDSCH (i.e., Alt 2 in the Above-Described Embodiment 4)+Individual HARQ-ACK Sub-CB (Codebook)+when Time Bundling is Configured When time bundling is configured for one or more serving cells (all or part of) configured in a terminal as in Embodiment 1, a type-2 HCB configuration is proposed.

M-DCI: It may be the same as in Embodiment 4-4 or may be increased (increased for each C/T-DAI) by ceiling{log 2 (a maximum value among G_max values for each CC (or BWP) configured in the same cell group)} to the existing DL DAI size (i.e., 2 bits each for a C/T-DAI). Here, G_max is the number of groups for (maximum) time bundling configured in a specific cell.

S-DCI or UL grant: It may be the same as in the above Embodiment 4-4.

HARQ-ACK payload for sub-CB corresponding to multi-PDSCH case: If a DAI size for M-DCI follows the Embodiment 4-4, A HARQ-ACK payload may be configured by bundling PDSCHs corresponding to G_max (or G allocated to each cell) DAI. Alternatively, if a DAI size for M-DCI is determined based on G_max, one HARQ-ACK bit may be configured for each DAI.

HARQ-ACK payload for sub-CB corresponding to single PDSCH case: The number of HARQ-ACK bits per sub-CB DAI corresponding to single PDSCH case may be X (e.g., the X value may be 2 or 1 based on whether 2 TB is configured in a corresponding serving cell (i.e., whether PDSCH reception carrying two transport blocks is configured or the maximum number of schedulable transport blocks (or codewords) by one DCI). As another example, for a cell in which 2 TB is configured and spatial bundling for HARQ-ACK information is not configured, X=2. For a cell in which 2 TB is configured but spatial bundling is configured or for a cell in which 1 TB is configured, X=1).

Embodiment 4-5: DAI Count for Each W (W is a Natural Number) PDSCH(s) (i.e., Alt 3 of Embodiment 4)

When the W value is equal to N_max all (here, N_max all (here, N_max all means a maximum value among N_max values for each CC (or BWP) configured in the same cell group, and N_max means the maximum number of schedulable PDSCHs through M-DCI for a specific cell), since it has the same meaning as that a DAI is counted for each DCI (i.e., Alt 1 of Embodiment 4), Embodiment 4-1, Embodiment 4-1a, Embodiment 4-2, Embodiment 4-2a may be applied.

On the other hand, when the W value is smaller than N_max all, Embodiment 4-3, Embodiment 4-3a, Embodiment 4-4, and Embodiment 4-4a may be applied. However, here, the equation for calculating a DAI increase amount may be changed to ceiling{log 2 (a maximum value among N_max/W values for each CC (or BWP) configured in the same cell group)}. In addition, in a HARQ-ACK payload, the number of HARQ-ACK bits per DAI may be replaced with X*W bits instead of X bits. (When X=1) When the number of PDSCHs corresponding to a specific DAI is less than W, for example, K (K<W), the last W−K bit of the HARQ-ACK M-bits corresponding to the DAI may be mapped to a NACK.

Embodiment 5: DAI Signaling Method when a Plurality of PUCCHs Corresponding to a Plurality of PDSCHs Scheduled by One DCI are Indicated Since a DAI count should be individually performed between PDSCHs corresponding to different PUCCHs, there is a disadvantage in which an individual DAI field is required as many as the number of PUCCHs. For example, when N PDSCHs are scheduled by one DCI, a PUCCH corresponding to N1 PDSCHs may be indicated as slot n1 and a PUCCH corresponding to the remaining N2 PDSCHs may be indicated as slot n2 (i.e., N=N1+N2, where N1 value may be predefined or configured by higher layer signaling, or it may be determined as N1=ceiling{N/2}, N2=floor{N/2}, or it may be determined as N1=floor {N/2}, N2=ceiling{N/2}). Here, a C-DAI/T-DAI for N1 PDSCHs and a C-DAI/T-DAI for N2 PDSCHs may be required, respectively. In order to alleviate this DCI overhead problem, in case of a multi-PDSCH case, a rule may be configured (defined) to configure only individual C-DAI fields as many as the number of PUCCHs (without T-DAI). That is, only a C-DAI1 field for N1 PDSCHs and a C-DAI2 field for N2 PDSCHs are signaled in DL DCI, and a T-DAI field for N1 PDSCHs and a T-DAI field for N2 PDSCHs may be omitted in DL DCI signaling. If a terminal misses the last DCI (with T-DAI information) (for example, decoding failure, etc.), since there is no T-DAI in a corresponding multi-PDSCH case, a problem of HARQ-ACK payload mismatch between a base station and the terminal may occur. However, the above problem can be solved by additionally scheduling DCI including a reliable T-DAI by a base station. Alternatively, the above problem may be solved by a method in which different PUCCHs are indicated and a base station performs blind detection on the plurality of PUCCHs. Characteristically, in case of M-DCI, Case 1) when more than N PDSCHs (e.g., it may be predefined as a value such as N=1, or the value of N may be configured by higher layer signaling) are scheduled, multiple PUCCHs may be indicated, or Case 2) when N or less PDSCH(s) are scheduled, only one PUCCH may be indicated. In this case, in Case 2, C-DAI and T-DAI fields are configured in DCI, and C-DAI and T-DAI information may be indicated. On the other hand, in Case 1, only C-DAI1 field/information for N1 PDSCHs and C-DAI2 field/information for N2 PDSCHs may be configured/indicated, respectively. Here, bits interpreted as C-DAI and T-DAI fields in Case 2 may be interpreted as a C-DAI1 for N1 PDSCHs and a C-DAI2 for N2 PDSCHs (or vice versa) in Case 1, respectively.

Alternatively, the N/N1/N2 value may be a DL slot unit rather than a PDSCH unit. For example, when N' PDSCHs spanning N slots are scheduled by one DCI, a PUCCH corresponding to N1' PDSCHs spanning N1 slots may be indicated as slot n1, and a PUCCH corresponding to PDSCHs spanning the remaining N2 slots may be indicated as slot n2 (i.e., N=N1+N2, where N1 value may be pre-defined or configured by higher layer signaling, or it may be determined as N1=ceiling{N/2}, N2=floor{N/2}, or it may be determined as N1=floor {N/2}, N2=ceiling{N/2}). Here, a C-DAI/T-DAI for a PDSCH spanning N1 slots and a C-DAI/T-DAI for a PDSCH spanning N2 slots may be required, respectively. In order to alleviate this DCI overhead problem, in case of a multi-PDSCH case, a rule may be configured (defined) to configure only individual C-DAI fields as many as the number of PUCCHs (without T-DAI). That is, only a C-DAI1 field for a PDSCH spanning N1 slots and a C-DAI2 field for a PDSCH spanning N2 slots are signaled in DL DCI, and a T-DAI field for a PDSCH spanning N1 slots and a T-DAI field for a PDSCH spanning N2 slots may be omitted in the DL DCI signaling. If a terminal misses the last DCI (with T-DAI information) (e.g., decoding failure, etc.), since there is no T-DAI in a multi-PDSCH case, a problem of HARQ-ACK payload mismatch between a base station and the terminal may occur. However, the above problem can be solved by additionally scheduling DCI including a reliable T-DAI by a base station. Alternatively, the above problem may be solved by a method in which different PUCCHs are indicated and a base station performs blind detection on the plurality of PUCCHs. Characteristically, in case of M-DCI, Case 1) when PDSCHs spanning more than N slots (e.g., it may be predefined as a value such as N=1, or the value of N may be configured by higher layer signaling) are scheduled, multiple PUCCHs may be indicated, or Case 2) when PDSCH(s) spanning N or less slots are scheduled, only one PUCCH may be indicated. In this case, in Case 2, C-DAI and T-DAI fields are configured in DCI, and C-DAI and T-DAI information may be indicated. On the other hand, in Case 1, only C-DAI1 field/information for a PDSCH spanning N1 slots and C-DAI2 field/information for a PDSCH spanning N2 slots may be configured/indicated, respectively. Here, bits interpreted as C-DAI and T-DAI fields in Case 2 may be interpreted as a C-DAI1 for a PDSCH spanning N1 slots and a C-DAI2 for a PDSCH spanning N2 slots (or vice versa) in Case 1, respectively.

Embodiment 6: A Method of Configuring an Individual Sub-CB is Proposed when Configuring a DAI Count for Each DCI (i.e., Alt 1 in Embodiment 4)+Individual Sub-CB as in Embodiment 4-2

A sub-CB that may include HARQ-ACK information corresponding to a single PDSCH case may be defined as sub-CB #1, and a sub-CB that may include all or part of HARQ-ACK information corresponding to a multi-PDSCH case may be defined as sub-CB #2. When the number of HARQ-ACK bits corresponding to one DAI is defined as K, the K value corresponding to sub-CB #2 may be generally larger than the K value corresponding to sub-CB #1. Hereinafter, a S-DCI configuration cell may mean a cell in which M-DCI is not configured.

Case 1) when there is No Spatial Bundling Configuration, and 2-TB is Configured in a S-DCI Configuration Cell (and/or M-DCI Configuration Cell)

Since at least 2-TB is configured and spatial bundling is not configured in a S-DCI configuration cell, the number of HARQ-ACK bits for each DAI of sub-CB #1 may be determined to be 2 bits. Here, when only one or two PDSCH(s) of 1-TB or a single PDSCH of 2-TB are scheduled through M-DCI, HARQ-ACK information corresponding to the PDSCH(s) scheduled through the corresponding M-DCI may be included in sub-CB #1. In other cases, HARQ-ACK information corresponding to the PDSCH(s) scheduled through the corresponding M-DCI may be included in sub-CB #2. When HARQ-ACK information corresponding to PDSCH(s) scheduled through M-DCI as described above is included in sub-CB #1 and only 1-TB PDSCH is scheduled through M-DCI, the first bit of HARQ-ACK 2 bits corresponding to a corresponding DAI carries ACK or NACK information of the scheduled PDSCH, and the second bit may be always filled with a NACK or in the second bit, the first bit may be repeatedly transmitted (i.e., ACK or NACK information of the scheduled PDSCH). In addition, when only two PDSCHs of 2-TB are scheduled through M-DCI, HARQ-ACK information corresponding to PDSCHs scheduled through the corresponding M-DCI may be converted into 2 bits by spatial bundling and included in sub-CB #1.

Meanwhile, when time bundling is configured in M-DCI as in Embodiment 4-2b, if the number of time-bundled HARQ-ACK bits for scheduled PDSCHs is 1 or 2, the corresponding HARQ-ACK bit(s) may be included in sub-CB #1, otherwise it may be included in sub-CB #2.

Case 2) when there is No Spatial Bundling Configuration, and 2-TB is Configured Only in an M-DCI Configuration Cell Since 2-TB is not configured in all of S-DCI configuration cells, the number of HARQ-ACK bits for each DAI of sub-CB #1 may be determined to be 1 bit. Here, only when only a single PDSCH of 1-TB is scheduled by M-DCI, HARQ-ACK information corresponding to a PDSCH scheduled through the corresponding M-DCI may be included in sub-CB #1. In other cases, HARQ-ACK information corresponding to PDSCH(s) scheduled through a corresponding M-DCI may be included in sub-CB #2. In addition, when only one PDSCH of 2-TB is scheduled through M-DCI, HARQ-ACK information corresponding to the PDSCH scheduled through the M-DCI may be converted into 1 bit by spatial bundling and included in sub-CB #1.

Meanwhile, when time bundling is configured in M-DCI as in Embodiment 4-2b, if the number of time-bundled HARQ-ACK bits for scheduled PDSCHs is 1, the corresponding HARQ-ACK bit(s) may be included in sub-CB #1, otherwise may be included in sub-CB #2.

As another method, in this case as well, a method similar to that in Case 1 may be applied. For example, the number of HARQ-ACK bits for each DAI of sub-CB #1 may be determined to be 2 bits. Here, when only one or two PDSCH(s) of 1-TB or a single PDSCH of 2-TB are scheduled through M-DCI, HARQ-ACK information corresponding to the PDSCH(s) scheduled through the corresponding M-DCI may be included in sub-CB #1. In other cases, HARQ-ACK information corresponding to the PDSCH(s) scheduled through the corresponding M-DCI may be included in sub-CB #2. When HARQ-ACK information corresponding to PDSCH(s) scheduled through M-DCI as described above is included in sub-CB #1 and only 1-TB PDSCH is scheduled through M-DCI, the first bit of HARQ-ACK 2 bits corresponding to a corresponding DAI carries ACK or NACK information of the scheduled PDSCH, and the second bit may be always filled with a NACK or in the second bit, the first bit may be repeatedly transmitted (i.e., ACK or NACK information of the scheduled PDSCH). Similarly, in case of a 1-TB PDSCH scheduled through S-DCI, the first bit of HARQ-ACK 2 bits corresponding to a corresponding DAI carries ACK or NACK information of the scheduled PDSCH, and the second bit may be always filled with a NACK or in the second bit, the first bit may be repeatedly transmitted (i.e., ACK or NACK information of the scheduled PDSCH). In addition, when only two PDSCHs of 2-TB are scheduled through M-DCI, HARQ-ACK information corresponding to PDSCHs scheduled through the corresponding M-DCI may be converted into 2 bits by spatial bundling and included in sub-CB #1.

Meanwhile, when time bundling is configured in M-DCI as in Embodiment 4-2b, if the number of time-bundled HARQ-ACK bits for scheduled PDSCHs is 1 or 2, the corresponding HARQ-ACK bit(s) may be included in sub-CB #1, otherwise it may be included in sub-CB #2.

Case 3) when there is Spatial Bundling Configuration, or 2-TB is not Configured in all Cells (in One PUCCH Cell Group)

Since 2-TB is not configured in all of S-DCI configuration cells, the number of HARQ-ACK bits for each DAI of sub-CB #1 may be determined to be 1 bit. Here, only when only a single PDSCH (of 2-TB or 1-TB) is scheduled by M-DCI, HARQ-ACK information corresponding to a PDSCH scheduled through the corresponding M-DCI may be included in sub-CB #1. In other cases, HARQ-ACK information corresponding to PDSCH(s) scheduled through a corresponding M-DCI may be included in sub-CB #2. Alternatively, when two PDSCHs of 1-TB are scheduled through M-DCI, HARQ-ACK information corresponding to the PDSCHs scheduled through the corresponding M-DCI may be converted into 1 bit by time bundling and included in sub-CB #1. Alternatively, when two PDSCHs of 1-TB are scheduled through M-DCI, 2 bits of HARQ-ACK information corresponding to PDSCHs scheduled through the corresponding M-DCI may be included in sub-CB #1.

Meanwhile, when time bundling is configured in M-DCI as in Embodiment 4-2b, if the number of time-bundled HARQ-ACK bits for scheduled PDSCHs is 1, the corresponding HARQ-ACK bit(s) may be included in sub-CB #1, otherwise may be included in sub-CB #2.

As another method for Case 3, the number of HARQ-ACK bits for each DAI of sub-CB #1 may be determined to be 2 bits. Here, similarly to case 1, when only one or two PDSCH(s) of 1-TB are scheduled through M-DCI, HARQ-ACK information corresponding to the PDSCH(s) scheduled through the corresponding M-DCI may be included in sub-CB #1. In other cases, HARQ-ACK information corresponding to the PDSCH(s) scheduled through the corresponding M-DCI may be included in sub-CB #2. In addition, in case of a 1-TB PDSCH scheduled through S-DCI, the first bit of HARQ-ACK 2 bits corresponding to a corresponding DAI carries ACK or NACK information of the scheduled PDSCH, and the second bit may be always filled with a NACK or in the second bit, the first bit may be repeatedly transmitted (i.e., ACK or NACK information of the scheduled PDSCH).

Meanwhile, when time bundling is configured in M-DCI as in Embodiment 4-2b, if the number of time-bundled HARQ-ACK bits for scheduled PDSCHs is 1 or 2, the corresponding HARQ-ACK bit(s) may be included in sub-CB #1, otherwise it may be included in sub-CB #2.

Embodiment 7: When Transmission/Reception of Some of PDSCH(s) Scheduled Through M-DCI can be Omitted, a Method of DAI Counting and HARQ-ACK CB (Codebook) Configuration is Proposed In the present embodiment, an omission of transmission/reception of some PDSCH(s) may mean at least some or all of the following cases.

PDSCH(s) overlapping a symbol (or a slot including a corresponding symbol) configured as uplink (or flexible) by higher layer signaling for common TDD configuration (e.g., tdd-UL-DL-ConfigurationCommon), higher layer signaling for dedicated TDD configuration (e.g., tdd-UL-DL-ConfigurationDedicated)

PDSCH(s) included in (or overlapping) resources configured/indicated by higher layer signaling for configuring a rate matching pattern (e.g., RateMatchPattern(s))

Here, as in Embodiment 4-3 (or Embodiment 4-3a/b) and Embodiment 4-4 (or Embodiment 4-4a/b), when a DAI value increases for each PDSCH, a method of DAI counting is proposed as follows.

1) Option 1: When transmission/reception of some of the plurality of PDSCHs scheduled by M-DCI can be omitted, a continuous value starting from a (C-)DAI value indicated through the DCI may be assigned to only an actual transmitted/received PDSCH(s) (not scheduling-based) in time order. For example, in case of a terminal receiving M-DCI in which four PDSCHs are scheduled, some (or all) OFDM symbols of the third PDSCH among them may be configured as uplink (or flexible) by tdd-UL-DL-ConfigurationCommon or tdd-UL-DL-ConfigurationDedicated. In addition, when a C-DAI value indicated by a corresponding M-DCI corresponds to 3, a terminal may be recognized that C-DAIS for the scheduled 1/2/4th are 3/4/5, respectively (a mapping of a C-DAI value to the 3rd PDSCH is skipped).

2) Option 2: When transmission/reception of some of the plurality of PDSCHs scheduled by M-DCI can be omitted, in this case, for a DAI value, a continuous values starting from a (C-)DAI value indicated through the DCI may be assigned to all PDSCH(s) scheduled through the DCI in time order, regardless of an actual transmission/reception. For example, in case of a terminal receiving M-DCI in which four PDSCHs are scheduled, some (or all) OFDM symbols of the third PDSCH among them may be configured as uplink (or flexible) by tdd-UL-DL-ConfigurationCommon or tdd-UL-DL-ConfigurationDedicated. In addition, when a C-DAI value indicated by a corresponding M-DCI corresponds to 3, a terminal may be recognized that C-DAIs for the scheduled 1/2/3/4th are 3/4/5/6, respectively.

In case of Option 2, HARQ-ACK information for a (C-)DAI value corresponding to PDSCH(s) in which transmission/reception is omitted may be mapped to a NACK. In addition, even when a DAI value increases for each DCI, as in the above Embodiment 4-1 (or Embodiment 4-1a/b) and Embodiment 4-2 (or Embodiment 4-2a/b), HARQ-ACK information corresponding to PDSCH(s) in which transmission/reception is omitted may be mapped to a NACK.

Embodiment 8: When the Transmission/Reception of Some of PUSCH(s) Scheduled Through M-DCI can be Omitted, a Method of Aperiodic CSI Reporting and Frequency Hopping is Proposed In the present embodiment, an omission of transmission/reception of some PUSCH(s) may mean at least some or all of the following cases.

PUSCH(s) overlapping a symbol (or a slot including a corresponding symbol) configured as downlink (or flexible) by higher layer signaling for common TDD configuration (e.g., tdd-UL-DL-ConfigurationCommon), higher layer signaling for dedicated TDD configuration (e.g., tdd-UL-DL-ConfigurationDedicated)

PUSCH(s) included in (or overlapping) resources configured/indicated by higher layer signaling (e.g., invalidSymbolPattern) for configuring an invalid symbol pattern In this case, aperiodic CSI reporting and frequency hopping methods are proposed.

Meanwhile, aperiodic CSI reporting through M-DCI may follow the following regulations.

When DCI format 0_1 schedules two PUSCH allocations, an aperiodic CSI report is carried on the second scheduled PUSCH. When DCI format 0_1 schedules more than two PUSCH allocations, an aperiodic CSI report is carried on the penultimate scheduled PUSCH.

However, when transmission/reception of some of a plurality of PUSCHs scheduled by M-DCI can be omitted, a PUSCH to which an aperiodic CSI report is transmitted may be determined by targeting only actual transmitted/received PUSCH(s) (not scheduling-based). That is, when the actual number of transmitted/received PUSCHs is two, CSI may be reported through the second PUSCH (from among two actual transmitted/received PUSCHs), and when the actual number of transmitted/received PUSCHs is three or more, CSI may be reported through the penultimate PUSCH (among a plurality of actual transmitted/received PUSCHs). Specifically, it may be as follows.

For example, in case of a terminal receiving M-DCI in which four PUSCHs are scheduled, some (or all) OFDM symbols of the third PUSCH among them may be configured as downlink (or flexible) by tdd-UL-DL-ConfigurationCommon or tdd-UL-DL-ConfigurationDedicated. Here, when an aperiodic CSI report is triggered in the corresponding M-DCI, aperiodic CSI may be reported on the second scheduled PUSCH, which is the penultimate scheduled PUSCH based on the actually transmitted PUSCH.

Meanwhile, when DCI format 0_1 schedules no less than two PUSCH allocations but only two PUSCHs are transmitted, an aperiodic CSI report is carried on the second transmitted PUSCH. When DCI format 0_1 schedules more than two PUSCH allocations and more than two PUSCHs are transmitted, an aperiodic CSI report is carried on the penultimate transmitted PUSCH.

Meanwhile, in case of frequency hopping (for a plurality of PUSCHs scheduled through M-DCI), when inter-slot hopping is applied, the W's value in Equation 3 below may increase according to an actual transmitted PUSCH (not based on scheduled PUSCH). That is, a value of the corresponding parameter W's may not increase for a scheduled but not actually transmitted PUSCH.

In case of inter-slot frequency hopping, the starting RB during slot W's is given by Equation 3 below.

[Equation 3]

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}$$

In the equation 3, $n_s^\mu$ is the current slot number within a radio frame. Here, a multi-slot PUSCH transmission can take place, $RB_{start}$ is the starting RB in the UL BWP, as calculated from the resource block assignment information of resource allocation type 1 and $RB_{offset}$ is the frequency offset in RBs between the two frequency hops.

Figure 12:
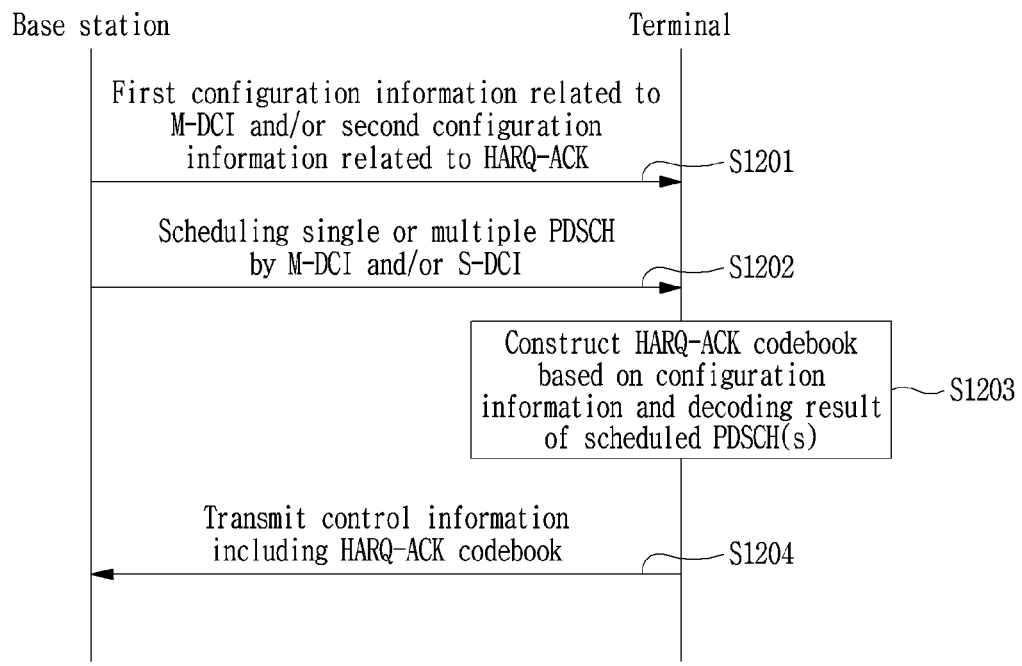
FIG. 12 is a diagram illustrating a signaling procedure between a base station and a terminal for a method for transmitting and receiving control information according to an embodiment of the present disclosure.

FIG. 12 is a diagram illustrating a signaling procedure between a base station and a terminal for a method of transmitting and receiving control information according to an embodiment of the present disclosure.

FIG. 12 exemplifies a signaling procedure between a user equipment (UE) and a base station (BS) based on the previously proposed methods (e.g., any one of Embodiments 1 to 8 and detailed embodiments thereof or a combination of one or more (detailed) embodiments). FIG. 12 is only for convenience of description, but it is not intended to limit a scope of the present disclosure. In addition, some step(s) shown in FIG. 12 may be omitted according to a situation and/or a configuration, etc. In addition, a base station and a terminal in FIG. 12 are only one example and may be implemented as an apparatus illustrated in FIG. 15 below. For example, a processor (102/202) of FIG. 15 may control to transmit/receive a channel/signal/data/information, etc. using a transceiver (106/206), and control to store a channel/signal/data/information, etc. to be transmitted or received in a memory (104/204).

In addition, in an operation between a base station and a terminal of FIG. 12, even if there is no separate description, the above-mentioned contents may be referenced/used.

A base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc. In addition, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.).

Referring to FIG. 12, signaling between one base station and one terminal is considered for convenience of description, but of course, the signaling method may be extended and applied to signaling between multiple TRPs and multiple terminals. In the following description, a base station may be interpreted as one TRP. Alternatively, a base station may include a plurality of TRPs, or may be one cell including a plurality of TRPs.

In reference to FIG. 12, a terminal receives first configuration information related to M-DCI and/or second configuration information related to HARQ-ACK from a base station (S1201).

Here, first configuration information and second configuration information may be transmitted by higher layer signaling (e.g., RRC signaling, MAC CE, etc.).

First configuration information may mean configuration information (e.g., PDSCH-TimeDomainResourceAllocationListForMultiPDSCH) for configuring whether a plurality of PDSCHs can be scheduled by a single DCI. For example, if information for configuring scheduling for transmission of a plurality of PDSCHs (or PUSCHs) through one DCI is provided for a corresponding serving cell, scheduling for transmission of a plurality of PDSCHs (or PUSCHs) through one DCI on the corresponding cell (this is referred to as multi-PDSCH scheduling) may be configured/supported. On the other hand, if information for configuring scheduling for transmission of a plurality of PDSCHs (or PUSCHs) through one DCI is not provided for the corresponding serving cell, multi-PDSCH scheduling may not be configured/supported on the corresponding cell.

Second configuration information may include information for configuring a type of a HARQ-ACK codebook (e.g., RRC parameter pdsch-HARQ-ACK-Codebook indicating type-1 (i.e., semi-static) HARQ-ACK codebook or type-2 (i.e., dynamic) HARQ-ACK codebook), information for HARQ-ACK bundling (i.e., time bundling) configuration, information on the number of HARQ-ACK bundling groups (e.g., numberOfHARQBundlingGroups). Here, for example, if information for configuring the number of HARQ bundling groups for a specific serving cell is provided, it may be considered that time bundling is configured for the specific serving cell. On the other hand, if information for configuring the number of HARQ bundling groups for a specific serving cell is not provided, it may be considered that time bundling is configured for the specific serving cell.

In other words, multi-PDSCH scheduling may be configured for one or more serving cells among a plurality of serving cells configured for a terminal. In a serving cell in which multi-PDSCH scheduling is not configured, one PDSCH may be scheduled by a single DCI as in the prior art. In addition, HARQ-ACK bundling (i.e., time bundling) may be configured for one or more serving cells among one or more serving cells for which multi-PDSCH scheduling is configured. For example, as described above, by configuring the number of HARQ-ACK bundling groups, HARQ-ACK bundling may be configured in a corresponding cell. As such, for a plurality of PDSCHs scheduled on a serving cell in which HARQ-ACK bundling is configured, HARQ-ACK information may be generated for each one or more groups. Here, by performing a logical AND operation on HARQ-ACK information for a plurality of PDSCHs included in each group of the one or more groups, HARQ-HARQ information for each group may be generated.

Here, when the number of HARQ-ACK bundling groups is set to one, a single HARQ-ACK information may be generated, and when the number of HARQ-ACK bundling groups is set to be greater than one, HARQ-ACK information for the number of groups may be generated. On the other hand, for a cell in which HARQ-ACK bundling (i.e., time bundling) is not configured in one or more serving cells in which multi-PDSCH scheduling is configured, HARQ-ACK information may be generated for each of a plurality of PDSCHs scheduled in the corresponding cell.

Here, based on Embodiment 1 described above, time bundling may be configured for one or more cells among a plurality of cells configured for a terminal.

A terminal receives M-DCI and/or S-DCI for single or multiple PDSCH scheduling from a base station, and receives the scheduled single or multiple PDSCH (S1202).

Here, a terminal may receive DCI through a PDCCH.

As described above, one or more PDSCHs may be scheduled by M-DCI on a cell in which M-DCI is configured among a plurality of serving cells configured for a terminal. On the other hand, a single PDSCH may be scheduled by S-DCI on a cell in which M-DCI is not configured among a plurality of serving cells configured for a terminal.

That is, a terminal may receive DCI (e.g., each DCI format for each serving cell) for scheduling one or more PDSCHs in each of a plurality of configured serving cells. In addition, a terminal may receive one or more PDSCHs in each of a plurality of configured serving cells (i.e., a plurality of PDSCHs are received in a plurality of configured serving cells).

Here, in DAI signaling, based on any one or a combination of one or more detailed embodiments of the above-described Embodiment 4, or based on the above-described Embodiment 5, or based on the above-described Embodiment 7, DAI signaling may be performed.

A terminal constructs/generates a HARQ-ACK codebook based on configuration information and decoding result (i.e., ACK or NACK) of scheduled PDSCH(s) (S1203).

Here, a terminal may configure/generate a type-1 HARQ-ACK codebook based on the Embodiment 2 described above when time bundling is configured. Alternatively, a terminal may configure/generate a type-1 HARQ-ACK codebook based on the Embodiment 3 described above when slot-group based PDCCH monitoring is configured. Alternatively, a terminal may configure/generate a type-2 HARQ-ACK codebook based on any one or a combination of one or more detailed embodiments of the above-described Embodiment 4 or based on the above-described Embodiment 6. Alternatively, when transmission/reception of some of PDSCH(s) scheduled by M-DCI is omitted, a HARQ-ACK codebook may be configured/generated based on the Embodiment 7 described above.

Meanwhile, based on the above-described Embodiment 1, when only PDSCH overlapped with an uplink symbol in a specific group of HARQ bundling is included, HARQ-ACK information for the specific group may be generated as a NACK (negative ACK). Alternatively, when one or more PDSCHs overlapped with an uplink symbol in a specific group of HARQ bundling are included, HARQ-ACK information for the specific group may be generated by considering HARQ-ACK information for the one or more PDSCHs overlapped with the uplink symbol as an ACK or a NACK (negative ACK).

A terminal transmits HARQ-ACK information to a base station at the time indicated by DCI for scheduling a PDSCH based on a HARQ-ACK codebook type configured by configuration information (S1204).

A terminal transmits control information including the generated HARQ-ACK codebook to a base station through a PUCCH or a PUSCH. Here, control information may further include a scheduling request, channel state information, uplink data (in case of PUSCH), etc. in addition to a HARQ-ACK codebook.

Figure 13:
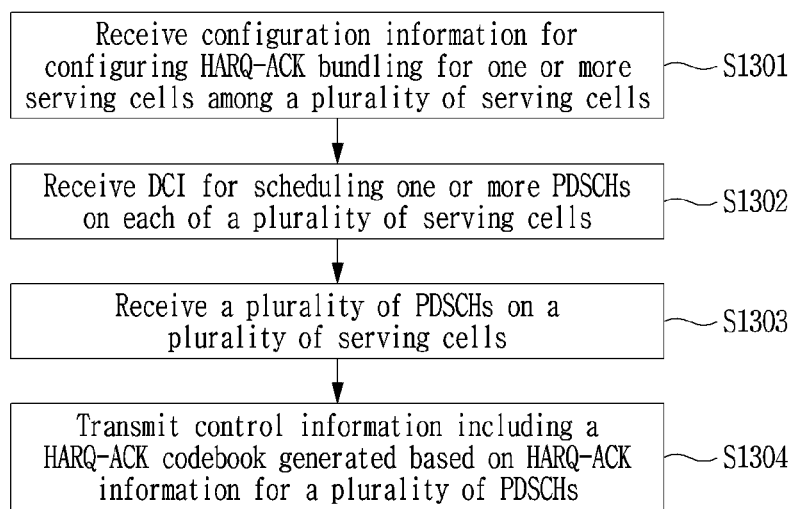
FIG. 13 is a diagram illustrating an operation of a terminal illustrating for transmitting and receiving control information according to an embodiment of the present disclosure.

FIG. 13 is a diagram illustrating an operation of a terminal for a method of transmitting and receiving control information according to an embodiment of the present disclosure.

FIG. 13 exemplifies an operation of a terminal based on the above-described proposed methods (e.g., any one of Embodiments 1 to 8 and detailed embodiments thereof or a combination of one or more (detailed) embodiments). FIG. 13 is only for convenience of description, but it is not intended to limit a scope of the present disclosure. Some step(s) shown in FIG. 13 may be omitted according to a situation and/or a configuration, etc. In addition, a terminal in FIG. 13 is only one example, and may be implemented as a device illustrated in FIG. 15. For example, a processor (102/202) of FIG. 15 may control to transmit and receive channel/signal/data/information, etc. (e.g., RRC signaling, MAC CE, DCI for UL/DL scheduling, SRS, PDCCH, PDSCH, PUSCH, PUCCH, PHICH, etc.) by using a transceiver (106/206), and control to store transmitted or received channel/signal/data/information in a memory (104/204).

A terminal receives, from a base station, configuration information (hereinafter, first configuration information) for configuring HARQ-ACK bundling for one or more serving cells among a plurality of serving cells configured for the terminal (S1301).

Here, the first configuration information may further include information for configuring a type of a HARQ-ACK codebook (e.g., RRC parameter pdsch-HARQ-ACK-Codebook indicating type-1 (i.e., semi-static) HARQ-ACK codebook or type-2 (i.e., dynamic) HARQ-ACK codebook) and/or information on the number of HARQ-ACK bundling groups (e.g., numberOfHARQBundlingGroups).

In addition, as described above, the first configuration information may correspond to information on the number of HARQ-ACK bundling groups. That is, if information for configuring the number of HARQ bundling groups for a specific serving cell is provided, it may be considered that time bundling is configured for the specific serving cell. For example, if information for configuring the number of HARQ bundling groups for a specific serving cell is provided, it may be considered that time bundling is configured for the specific serving cell. On the other hand, if information for configuring the number of HARQ bundling groups for a specific serving cell is not provided, it may be considered that time bundling is not configured for the specific serving cell.

In addition, together with the first configuration information (i.e., through one message or information element (IE)) or separately from the first configuration information (i.e., through different messages or IEs), a terminal may receive, from a base station, second configuration information (e.g., PDSCH-TimeDomainResourceAllocationListForMulti-PDSCH) for configuring scheduling (referred to as multi-PDSCH scheduling) for a plurality of PDSCHs by a single DCI for one or more serving cells among a plurality of serving cells configured for the terminal. For example, if information for configuring scheduling for transmission of a plurality of PDSCHs (or PUSCHs) through one DCI is provided for a corresponding serving cell, scheduling for (this is referred to as multi-PDSCH scheduling) transmission of a plurality of PDSCHs (or PUSCHs) through one DCI on the corresponding cell may be configured/supported. On the other hand, if information for configuring scheduling for transmission of a plurality of PDSCHs (or PUSCHs) through one DCI is not provided for a corresponding serving cell, multi-PDSCH scheduling may not be configured/supported on the corresponding cell.

Multi-PDSCH scheduling may be configured for one or more serving cells among a plurality of serving cells configured for a terminal. In a serving cell in which multi-PDSCH scheduling is not configured, one PDSCH may be scheduled by a single DCI as in the prior art. In addition, HARQ-ACK bundling (i.e., time bundling) may be configured for one or more serving cells among one or more serving cells for which multi-PDSCH scheduling is configured. For example, as described above, by configuring the number of HARQ-ACK bundling groups, HARQ-ACK bundling may be configured in a corresponding cell. As such, for a plurality of PDSCHs scheduled on a serving cell in which HARQ-ACK bundling is configured, HARQ-ACK information may be generated for each one or more groups. Here, by performing a logical AND operation on HARQ-ACK information for a plurality of PDSCHs included in each group of the one or more groups, HARQ-HARQ information for each group may be generated.

Here, when the number of HARQ-ACK bundling groups is set to one, a single HARQ-ACK information may be generated, and when the number of HARQ-ACK bundling groups is set to be greater than one, HARQ-ACK information for the number of groups may be generated. On the other hand, for a cell in which HARQ-ACK bundling (i.e., time bundling) is not configured in one or more serving cells in which multi-PDSCH scheduling is configured, HARQ-ACK information may be generated for each of a plurality of PDSCHs scheduled in the corresponding cell.

Here, first configuration information and second configuration information may be transmitted by higher layer signaling (e.g., RRC signaling, MAC CE, etc.).

Here, based on Embodiment 1 described above, time bundling may be configured for one or more cells among a plurality of cells configured for a terminal.

A terminal receives, from a base station, DCI for scheduling one or more PDSCHs in each of a plurality of serving cells configured for the terminal (S1302), and a terminal receives, from a base station, a plurality of PDSCHs on a plurality of serving cells configured for the terminal (S1303).

Here, DCI may be transmitted through a PDCCH.

As described above, one or more PDSCHs may be scheduled by M-DCI on a cell in which M-DCI is configured among a plurality of serving cells configured for a terminal. On the other hand, a single PDSCH may be scheduled by S-DCI on a cell in which M-DCI is not configured among a plurality of serving cells configured for a terminal.

That is, a terminal may receive DCI (e.g., each DCI format for each serving cell) for scheduling one or more PDSCHs in each of a plurality of configured serving cells. In addition, a terminal may receive one or more PDSCHs in each of a plurality of configured serving cells (i.e., a plurality of PDSCHs are received in a plurality of configured serving cells).

Here, in DAI signaling, based on any one or a combination of one or more detailed embodiments of the above-described Embodiment 4, or based on the above-described Embodiment 5, or based on the above-described Embodiment 7, DAI signaling may be performed.

A terminal generates a HARQ-ACK codebook based on HARQ-ACK information for a plurality of PDSCHs, and transmits control information including the generated HARQ-ACK codebook to a base station (S1304).

Here, a terminal may configure/generate a type-1 HARQ-ACK codebook based on the Embodiment 2 described above when time bundling is configured. Alternatively, a terminal may configure/generate a type-1 HARQ-ACK codebook based on the Embodiment 3 described above when slot-group based PDCCH monitoring is configured.

Alternatively, a terminal may configure/generate a type-2 HARQ-ACK codebook based on any one or a combination of one or more detailed embodiments of the above-described Embodiment 4.

More specifically, a HARQ-ACK codebook may include a first HARQ-ACK sub-codebook and a second HARQ-ACK sub-codebook. For example, a HARQ-ACK codebook may be generated by appending a second HARQ-ACK sub-codebook to a first HARQ-ACK sub-codebook.

In this case, a C-DAI value and a T-DAI value of the DCI may be individually applied to each of the first HARQ-ACK sub-codebook and the second HARQ-ACK sub-codebook.

Here, the first HARQ-ACK sub-codebook may be generated for PDSCHs on one or more first serving cells in which the number of groups of HARQ bundling is set to 1. In addition, the second HARQ-ACK sub-codebook may be generated for PDSCHs on one or more second serving cells in which the number of HARQ bundling groups is set to be greater than 1.

Meanwhile, when the second configuration information is received, among a plurality of serving cells configured for a terminal, the first HARQ-ACK sub-codebook may be generated for PDSCHs on the one or more first serving cells in which the multi-PDSCH scheduling is not configured or the number of groups of the HARQ bundling is set to 1. In addition, among the one or more serving cells in which the multi-PDSCH scheduling is configured, the second HARQ-ACK sub-codebook may be generated for PDSCHs on the one or more second serving cells in which the number of the HARQ bundling groups is set to be greater than 1 or the HARQ bundling is not configured.

Here, when the HARQ bundling is configured for the one or more second serving cells, the second HARQ-ACK sub-codebook may be generated based on first HARQ-ACK information bits. The number of the first HARQ-ACK information bits may correspond to a maximum value between the products of the number of HARQ bundling groups and a value of X across all of the one or more second serving cells. For a cell in which PDSCH reception carrying two transport blocks is configured (i.e., the number of maximum TBs (or codewords) by one DCI is set to 2) and spatial bundling for HARQ-ACK information (i.e., HARQ-ACK information bit is generated by logical AND operation of HARQ-ACK information bits corresponding to a first TB and a second TB) is not configured, the value of X may be 2, otherwise the value of X may be 1.

Alternatively, when the HARQ bundling is not configured for the one or more second serving cells, the second HARQ-ACK sub-codebook may be generated based on second HARQ-ACK information bits. The number of the second HARQ-ACK information bits may correspond to a maximum value between the products of the number of PDSCHs that can be scheduled by a single DCI and a value of X across all of the one or more second serving cells. For a cell in which PDSCH reception carrying two transport blocks is configured (i.e., the number of maximum TBs (or codewords) by one DCI is set to 2) and spatial bundling for HARQ-ACK information (i.e., HARQ-ACK information bit is generated by logical AND operation of HARQ-ACK information bits corresponding to a first TB and a second TB) is not configured, the value of X may be 2, otherwise the value of X may be 1.

Alternatively, a type-2 HARQ-ACK codebook may be configured/generated based on the above-described Embodiment 6. Alternatively, when transmission/reception of some of PDSCH(s) scheduled by M-DCI is omitted, a HARQ-ACK codebook may be configured/generated based on the Embodiment 7 described above.

Meanwhile, based on the above-described Embodiment 1, when only PDSCH overlapped with an uplink symbol in a specific group of HARQ bundling is included, HARQ-ACK information for the specific group may be generated as a NACK (negative ACK). Alternatively, when one or more PDSCHs overlapped with an uplink symbol in a specific group of HARQ bundling are included, HARQ-ACK information for the specific group may be generated by considering HARQ-ACK information for the one or more PDSCHs overlapped with the uplink symbol as an ACK or a NACK (negative ACK).

As described above, a terminal may generate a HARQ-ACK codebook based on a HARQ-ACK codebook type configured by configuration information. In addition, a terminal may transmit control information including the generated HARQ-ACK codebook to a base station through a PUCCH or a PUSCH. Here, HARQ-ACK information may be transmitted to a base station at the time indicated by DCI scheduling a PDSCH. In addition, control information may further include a scheduling request, channel state information, uplink data (in case of PUSCH), etc. in addition to a HARQ-ACK codebook.

Figure 14:
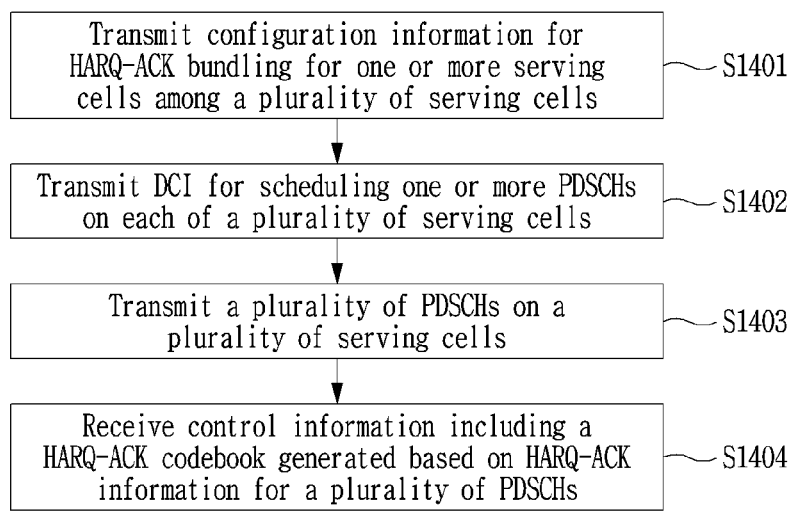
FIG. 14 is a diagram illustrating an operation of a base station for a method of transmitting and receiving control information according to an embodiment of the present disclosure.

FIG. 14 is a diagram illustrating an operation of a base station for a method of transmitting and receiving control information according to an embodiment of the present disclosure.

FIG. 14 exemplifies an operation of a base station based on the above-described proposed methods (e.g., any one of Embodiments 1 to 8 and detailed embodiments thereof or a combination of one or more (detailed) embodiments). FIG. 14 is only for convenience of description, but it is not intended to limit a scope of the present disclosure. Some step(s) shown in FIG. 14 may be omitted according to a situation and/or a configuration, etc. In addition, a base station in FIG. 14 is only one example, and may be implemented as a device illustrated in FIG. 15. For example, a processor (102/202) of FIG. 15 may control to transmit and receive channel/signal/data/information, etc. (e.g., RRC signaling, MAC CE, DCI for UL/DL scheduling, SRS, PDCCH, PDSCH, PUSCH, PUCCH, PHICH, etc.) by using a transceiver (106/206), and control to store transmitted or received channel/signal/data/information in a memory (104/204).

A base station transmits, to a terminal, configuration information (hereinafter, first configuration information) for configuring HARQ-ACK bundling for one or more serving cells among a plurality of serving cells configured for the terminal (S1401).

Here, the first configuration information may further include information for configuring a type of a HARQ-ACK codebook (e.g., RRC parameter pdsch-HARQ-ACK-Codebook indicating type-1 (i.e., semi-static) HARQ-ACK codebook or type-2 (i.e., dynamic) HARQ-ACK codebook) and/or information on the number of HARQ-ACK bundling groups (e.g., numberOfHARQBundlingGroups).

In addition, as described above, the first configuration information may correspond to information on the number of HARQ-ACK bundling groups. That is, if information for configuring the number of HARQ bundling groups for a specific serving cell is provided, it may be considered that time bundling is configured for the specific serving cell. For example, if information for configuring the number of HARQ bundling groups for a specific serving cell is provided, it may be considered that time bundling is configured for the specific serving cell. On the other hand, if information for configuring the number of HARQ bundling groups for a specific serving cell is not provided, it may be considered that time bundling is not configured for the specific serving cell.

In addition, together with the first configuration information (i.e., through one message or information element (IE)) or separately from the first configuration information (i.e., through different messages or IEs), a base station may transmit, to a terminal, second configuration information (e.g., PDSCH-TimeDomainResourceAllocationListForMultiPDSCH) for configuring scheduling (referred to as multi-PDSCH scheduling) for a plurality of PDSCHs by a single DCI for one or more serving cells among a plurality of serving cells configured for the terminal. For example, if information for configuring scheduling for transmission of a plurality of PDSCHs (or PUSCHs) through one DCI is provided for a corresponding serving cell, scheduling for (this is referred to as multi-PDSCH scheduling) transmission of a plurality of PDSCHs (or PUSCHs) through one DCI on the corresponding cell may be configured/supported. On the other hand, if information for configuring scheduling for transmission of a plurality of PDSCHs (or PUSCHs) through one DCI is not provided for a corresponding serving cell, multi-PDSCH scheduling may not be configured/supported on the corresponding cell.

Multi-PDSCH scheduling may be configured for one or more serving cells among a plurality of serving cells configured for a terminal. In a serving cell in which multi-PDSCH scheduling is not configured, one PDSCH may be scheduled by a single DCI as in the prior art. In addition, HARQ-ACK bundling (i.e., time bundling) may be configured for one or more serving cells among one or more serving cells for which multi-PDSCH scheduling is configured. For example, as described above, by configuring the number of HARQ-ACK bundling groups, HARQ-ACK bundling may be configured in a corresponding cell. As such, for a plurality of PDSCHs scheduled on a serving cell in which HARQ-ACK bundling is configured, HARQ-ACK information may be generated for each one or more groups. Here, by performing a logical AND operation on HARQ-ACK information for a plurality of PDSCHs included in each group of the one or more groups, HARQ-HARQ information for each group may be generated.

Here, when the number of HARQ-ACK bundling groups is set to one, a single HARQ-ACK information may be generated, and when the number of HARQ-ACK bundling groups is set to be greater than one, HARQ-ACK information for the number of groups may be generated. On the other hand, for a cell in which HARQ-ACK bundling (i.e., time bundling) is not configured in one or more serving cells in which multi-PDSCH scheduling is configured, HARQ-ACK information may be generated for each of a plurality of PDSCHs scheduled in the corresponding cell.

Here, first configuration information and second configuration information may be transmitted by higher layer signaling (e.g., RRC signaling, MAC CE, etc.).

Here, based on Embodiment 1 described above, time bundling may be configured for one or more cells among a plurality of cells configured for a terminal.

A base station transmits, to a terminal, DCI for scheduling one or more PDSCHs in each of a plurality of serving cells configured for the terminal (S1402), and a base station transmits, to a terminal, a plurality of PDSCHs on a plurality of serving cells configured for the terminal (S1403).

Here, DCI may be transmitted through a PDCCH.

As described above, one or more PDSCHs may be scheduled by M-DCI on a cell in which M-DCI is configured among a plurality of serving cells configured for a terminal. On the other hand, a single PDSCH may be scheduled by S-DCI on a cell in which M-DCI is not configured among a plurality of serving cells configured for a terminal.

That is, a base station may transmit DCI (e.g., each DCI format for each serving cell) for scheduling one or more PDSCHs in each of a plurality of serving cells configured for a terminal. In addition, a base station may transmit one or more PDSCHs in each of a plurality of serving cells configured for a terminal (i.e., a plurality of PDSCHs are transmitted in a plurality of configured serving cells).

Here, in DAI signaling, based on any one or a combination of one or more detailed embodiments of the above-described Embodiment 4, or based on the above-described Embodiment 5, or based on the above-described Embodiment 7, DAI signaling may be performed.

A base station receives, from a terminal, control information including a HARQ-ACK codebook generated based on HARQ-ACK information for a plurality of PDSCHs (S1404).

Here, a type-1 HARQ-ACK codebook may be configured/generated based on the Embodiment 2 described above when time bundling is configured. Alternatively, a type-1 HARQ-ACK codebook may be configured/generated based on the Embodiment 3 described above when slot-group based PDCCH monitoring is configured.

Alternatively, a type-2 HARQ-ACK codebook may configured/generated based on any one or a combination of one or more detailed embodiments of the above-described Embodiment 4.

More specifically, a HARQ-ACK codebook may include a first HARQ-ACK sub-codebook and a second HARQ-ACK sub-codebook. For example, a HARQ-ACK codebook may be generated by appending a second HARQ-ACK sub-codebook to a first HARQ-ACK sub-codebook.

In this case, a C-DAI value and a T-DAI value of the DCI may be individually applied to each of the first HARQ-ACK sub-codebook and the second HARQ-ACK sub-codebook.

Here, the first HARQ-ACK sub-codebook may be generated for PDSCHs on one or more first serving cells in which the number of groups of HARQ bundling is set to 1. In addition, the second HARQ-ACK sub-codebook may be generated for PDSCHs on one or more second serving cells in which the number of HARQ bundling groups is set to be greater than 1.

Meanwhile, when the second configuration information is received, among a plurality of serving cells configured for a terminal, the first HARQ-ACK sub-codebook may be generated for PDSCHs on the one or more first serving cells in which the multi-PDSCH scheduling is not configured or the number of groups of the HARQ bundling is set to 1. In addition, among the one or more serving cells in which the multi-PDSCH scheduling is configured, the second HARQ-ACK sub-codebook may be generated for PDSCHs on the one or more second serving cells in which the number of the HARQ bundling groups is set to be greater than 1 or the HARQ bundling is not configured.

Here, when the HARQ bundling is configured for the one or more second serving cells, the second HARQ-ACK sub-codebook may be generated based on first HARQ-ACK information bits. The number of the first HARQ-ACK information bits may correspond to a maximum value between the products of the number of HARQ bundling groups and a value of X across all of the one or more second serving cells. For a cell in which PDSCH reception carrying two transport blocks is configured (i.e., the number of maximum TBs (or codewords) by one DCI is set to 2) and spatial bundling for HARQ-ACK information (i.e., HARQ-ACK information bit is generated by logical AND operation of HARQ-ACK information bits corresponding to a first TB and a second TB) is not configured, the value of X may be 2, otherwise the value of X may be 1.

Alternatively, when the HARQ bundling is not configured for the one or more second serving cells, the second HARQ-ACK sub-codebook may be generated based on second HARQ-ACK information bits. The number of the second HARQ-ACK information bits may correspond to a maximum value between the products of the number of PDSCHs that can be scheduled by a single DCI and a value of X across all of the one or more second serving cells. For a cell in which PDSCH reception carrying two transport blocks is configured (i.e., the number of maximum TBs (or codewords) by one DCI is set to 2) and spatial bundling for HARQ-ACK information (i.e., HARQ-ACK information bit is generated by logical AND operation of HARQ-ACK information bits corresponding to a first TB and a second TB) is not configured, the value of X may be 2, otherwise the value of X may be 1.

Alternatively, a type-2 HARQ-ACK codebook may be configured/generated based on the above-described Embodiment 6. Alternatively, when transmission/reception of some of PDSCH(s) scheduled by M-DCI is omitted, a HARQ-ACK codebook may be configured/generated based on the Embodiment 7 described above.

Meanwhile, based on the above-described Embodiment 1, when only PDSCH overlapped with an uplink symbol in a specific group of HARQ bundling is included, HARQ-ACK information for the specific group may be generated as a NACK (negative ACK). Alternatively, when one or more PDSCHs overlapped with an uplink symbol in a specific group of HARQ bundling are included, HARQ-ACK information for the specific group may be generated by considering HARQ-ACK information for the one or more PDSCHs overlapped with the uplink symbol as an ACK or a NACK (negative ACK).

A base station may receive control information including the generated HARQ-ACK codebook from a terminal through a PUCCH or a PUSCH. Here, HARQ-ACK information may be transmitted from a terminal at the time indicated by DCI scheduling a PDSCH. In addition, control information may further include a scheduling request, channel state information, uplink data (in case of PUSCH), etc. in addition to a HARQ-ACK codebook.

General Device to which the Present Disclosure May be Applied

Figure 15:
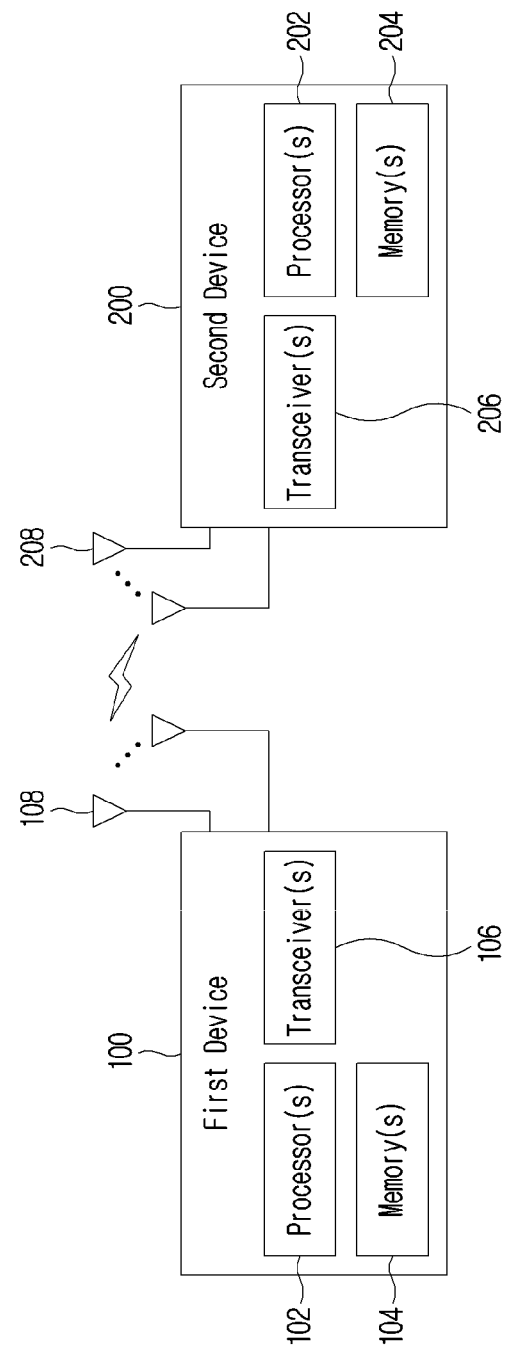
FIG. 15 is a diagram which illustrates a block diagram of a wireless communication device according to an embodiment of the present disclosure.

FIG. 15 is a diagram which illustrates a block diagram of a wireless communication device according to an embodiment of the present disclosure.

In reference to FIG. 15, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of transmitting HARQ (Hybrid Automatic Repeat and request)-ACK (acknowledgement) information in a wireless communication system, the method performed by a terminal and comprising:
    receiving configuration information for configuring HARQ-ACK bundling for one or more serving cells among a plurality of serving cells configured for the terminal;
    receiving downlink control information (DCI) for scheduling one or more physical downlink shared channels (PDSCH) on each of the plurality of serving cells;
    receiving a plurality of PDSCHs on the plurality of serving cells; and
    transmitting HARQ-ACK information for the plurality of PDSCHs,
    wherein a HARQ-ACK codebook corresponding to the HARQ-ACK information includes a first HARQ-ACK sub-codebook and a second HARQ-ACK sub-codebook,
    wherein the first HARQ-ACK sub-codebook is determined for one or more first serving cells for which number of groups of the HARQ-ACK bundling is set to 1, and
    wherein the second HARQ-ACK sub-codebook is determined for one or more second serving cells for which number of groups of the HARQ-ACK bundling is set greater than 1.

2. The method of claim 1, further comprising:
    receiving another configuration information for configuring multi-PDSCH scheduling for scheduling a plurality of PDSCHs by a single DCI for one or more serving cells among the plurality of serving cells.

3. The method of claim 2,
    wherein the first HARQ-ACK sub-codebook is determined for PDSCHs on the one or more first serving cells for which the multi-PDSCH scheduling is not configured or number of groups of the HARQ-ACK bundling is set to 1, among the plurality of serving cells, and
    wherein the second HARQ-ACK sub-codebook is determined for one or more second serving cells for which number of groups of the HARQ-ACK bundling is set greater than 1 or the HARQ-ACK bundling is not configured, among one or more serving cells configured the multi-PDSCH scheduling.

4. The method of claim 1,
    wherein, based on the HARQ-ACK bundling being configured for the one or more second serving cells, the second HARQ-ACK sub-codebook is determined based on a first HARQ-ACK information bits,
    wherein number of the first HARQ-ACK information bits corresponds to a maximum value between products of number of groups of the HARQ-ACK bundling and a value of X across all of the one or more second serving cells, and
    wherein for a cell for which PDSCH reception carrying two transport blocks is configured and spatial bundling for HARQ-ACK information is not configured, the X value is 2, otherwise the X value is 1.

5. The method of claim 1,
    wherein, based on the HARQ-ACK bundling being not configured for the one or more second serving cells, the second HARQ-ACK sub-codebook is determined based on a second HARQ-ACK information bits,
    wherein number of the second HARQ-ACK information bits corresponds to a maximum value between products of number of PDSCHs schedulable by a single DCI and a value of X across all of the one or more second serving cells, and
    wherein for a cell for which PDSCH reception carrying two transport blocks is configured and spatial bundling for HARQ-ACK information is not configured, the X value is 2, otherwise the X value is 1.

6. The method of claim 1,
    wherein a counter downlink assignment index (C-DAI) value and a total downlink assignment index (T-DAI) value of the DCI apply separately for each of the first HARQ-ACK sub-codebook and the second HARQ-ACK sub-codebook.

7. The method of claim 1, wherein the HARQ-ACK codebook is determined by appending the second HARQ-ACK sub-codebook to the first HARQ-ACK sub-codebook.

8. The method of claim 1,
    wherein, based on the HARQ-ACK bundling being configured for a specific serving cell, HARQ-ACK information is generated for each of one or more groups for a plurality of PDSCHs scheduled on the specific serving cell.

9. The method of claim 8, wherein HARQ-ACK information for each group is generated by performing a logical AND operation on HARQ-ACK information bits for a plurality of PDSCHs included in each group of the one or more groups.

10. The method of claim 8, wherein, based on only PDSCHs overlapped with an uplink symbol being included in a specific group of the HARQ-ACK bundling, the HARQ-ACK information for the specific group is generated as a negative ACK (NACK).

11. The method of claim 8, wherein, based on one or more PDSCHs overlapped with an uplink symbol being included in a specific group of the HARQ-ACK bundling, HARQ-ACK information for the one or more PDSCHs is regarded as an ACK or a NACK (negative ACK) to generate HARQ-ACK information for the specific group.

12. A terminal for transmitting HARQ (Hybrid Automatic Repeat and request)-ACK (acknowledgement) information in a wireless communication system, the terminal comprising:

at least one transceiver for transmitting and receiving a wireless signal;

at least one processor for controlling the at least one transceiver; and at least one memory storing instructions that, based on being executed by the at least one processor, perform operations comprising:

receiving configuration information for configuring HARQ bundling for one or more serving cells among a plurality of serving cells configured for the terminal;

receiving downlink control information (DCI) for scheduling one or more physical downlink shared channels (PDSCH) on each of the plurality of serving cells;

receiving a plurality of PDSCHs on the plurality of serving cells; and transmitting HARQ-ACK information for the plurality of PDSCHs, wherein a HARQ-ACK codebook corresponding to the HARQ-ACK information includes a first HARQ-ACK sub-codebook and a second HARQ-ACK sub-codebook, wherein the first HARQ-ACK sub-codebook is determined for one or more first serving cells for which number of groups of the HARQ-ACK bundling is set to 1, and wherein the second HARQ-ACK sub-codebook is determined for one or more second serving cells for which number of groups of the HARQ-ACK bundling is set greater than 1.

13. A method of receiving HARQ (Hybrid Automatic Repeat and request)-ACK (acknowledgement) information in a wireless communication system, the method performed by a base station and comprising:

transmitting configuration information for configuring HARQ-ACK bundling for one or more serving cells among a plurality of serving cells configured for a terminal;

transmitting downlink control information (DCI) for scheduling one or more physical downlink shared channels (PDSCH) on each of the plurality of serving cells;

transmitting a plurality of PDSCHs on the plurality of serving cells; and receiving HARQ-ACK information for the plurality of PDSCHs, wherein a HARQ-ACK codebook corresponding to the HARQ-ACK information includes a first HARQ-ACK sub-codebook and a second HARQ-ACK sub-codebook, wherein the first HARQ-ACK sub-codebook is determined for one or more first serving cells for which number of groups of the HARQ-ACK bundling is set to 1, and wherein the second HARQ-ACK sub-codebook is determined for one or more second serving cells for which number of groups of the HARQ-ACK bundling is set greater than 1.

* * * * *